United States Patent [19]

Chamberlin

[11] Patent Number: 4,597,053
[45] Date of Patent: Jun. 24, 1986

[54] TWO-PASS MULTIPLIER/ACCUMULATOR CIRCUIT

[75] Inventor: George P. Chamberlin, Scottsdale, Ariz.

[73] Assignee: Codex Corporation, Mansfield, Mass.

[21] Appl. No.: 510,102

[22] Filed: Jul. 1, 1983

[51] Int. Cl.$^4$ ............................................... G06F 7/02
[52] U.S. Cl. ...................................... 364/760; 364/715
[58] Field of Search ............... 364/760, 736, 716, 715; 340/146.2

[56] References Cited

U.S. PATENT DOCUMENTS

| | | | |
|---|---|---|---|
| 3,787,673 | 1/1974 | Watson et al. | 364/736 |
| 4,037,094 | 7/1977 | Vandierendonck | 364/716 |
| 4,041,292 | 8/1977 | Kindell | 364/760 |
| 4,215,416 | 7/1980 | Muramatsu | 364/736 |
| 4,484,301 | 11/1984 | Borgerding et al. | 364/760 |

*Primary Examiner*—David H. Malzahn
*Attorney, Agent, or Firm*—Walter W. Nielsen

[57] ABSTRACT

A two-pass Multiplier/Accumulator Circuit is provided which performs various arithmetic operations on operands contained within an X Register 10 (FIG. 1) and a Y Register 20 and places the result in an Accumulator Register 40. The arithmetic operations are carried out by passing the product of the operands successively through an array of adders in the Adder unit 34. Each adder adds an appropriate multiple of the contents of the X Register to the Accumulator 40 or to the output of the previous adder. The multiples are selected according to the contents of the Y Register.

The X and Y Registers are fully buffered so that additional data transfers and functions may be performed while an arithmetic operation is in progress in a "pipeline" manner.

The circuit is also capable of indicating the maximum or minimum value in a sequence of numbers in response to a single computer instruction to the circuit.

9 Claims, 35 Drawing Figures

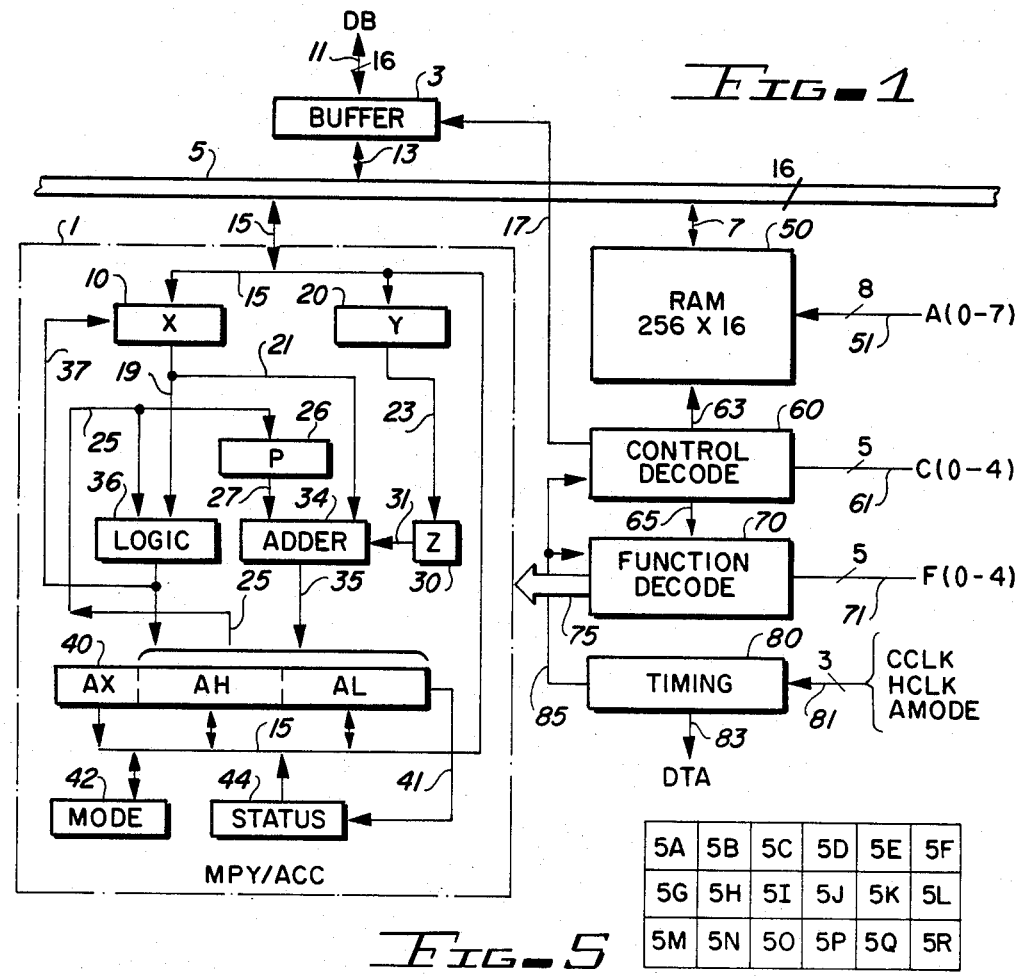
Fig-1
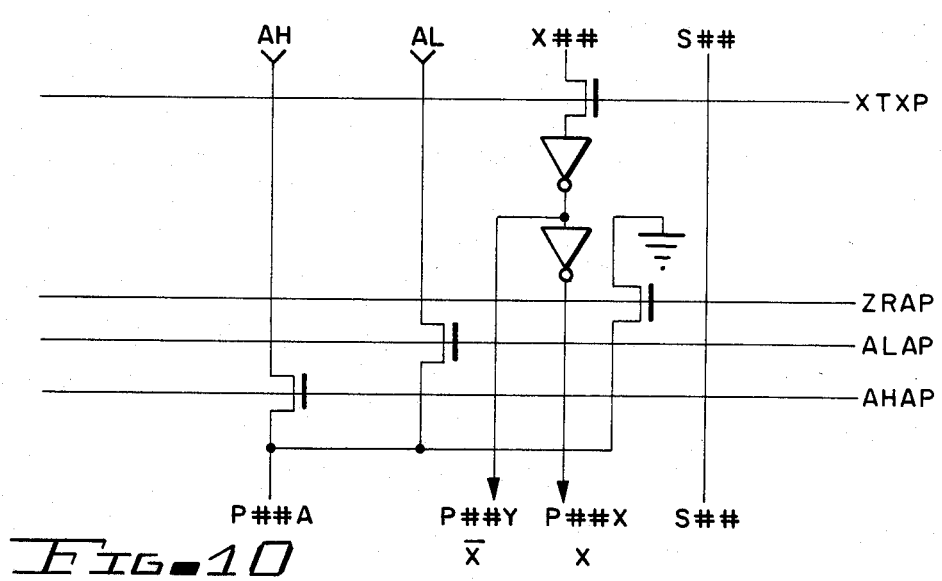
Fig-10
| 5A | 5B | 5C | 5D | 5E | 5F |
| 5G | 5H | 5I | 5J | 5K | 5L |
| 5M | 5N | 5O | 5P | 5Q | 5R |
Fig-5

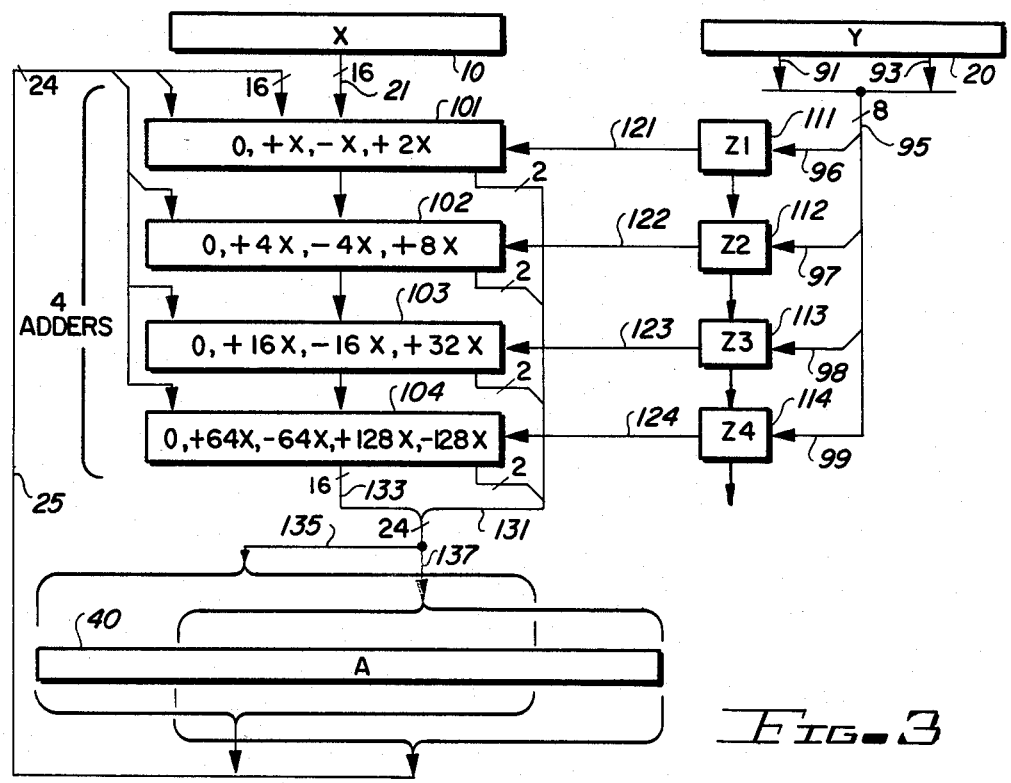
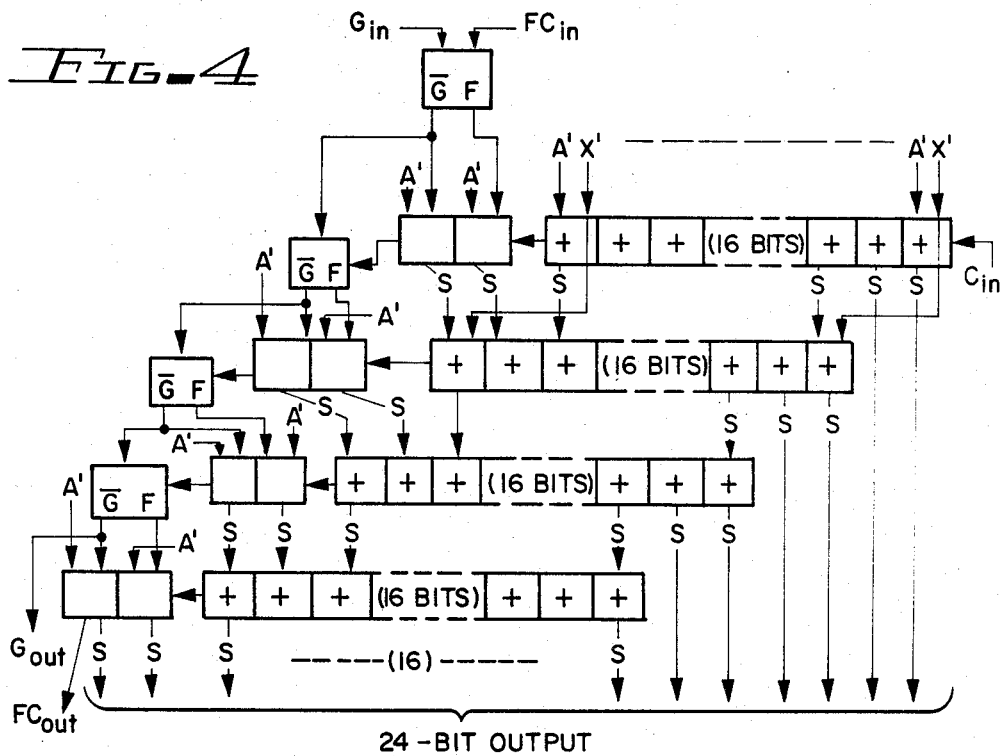

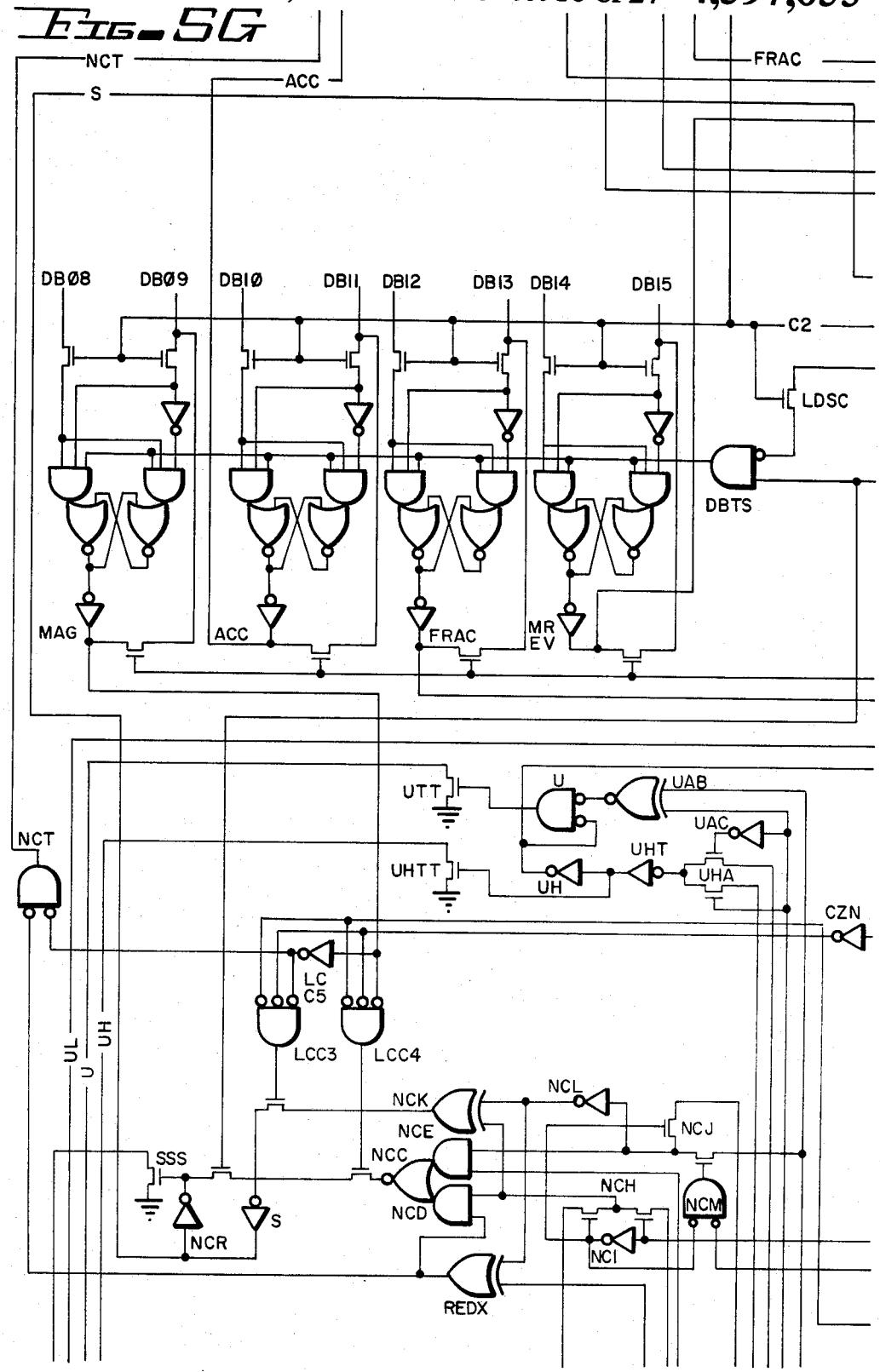
FIG_5G

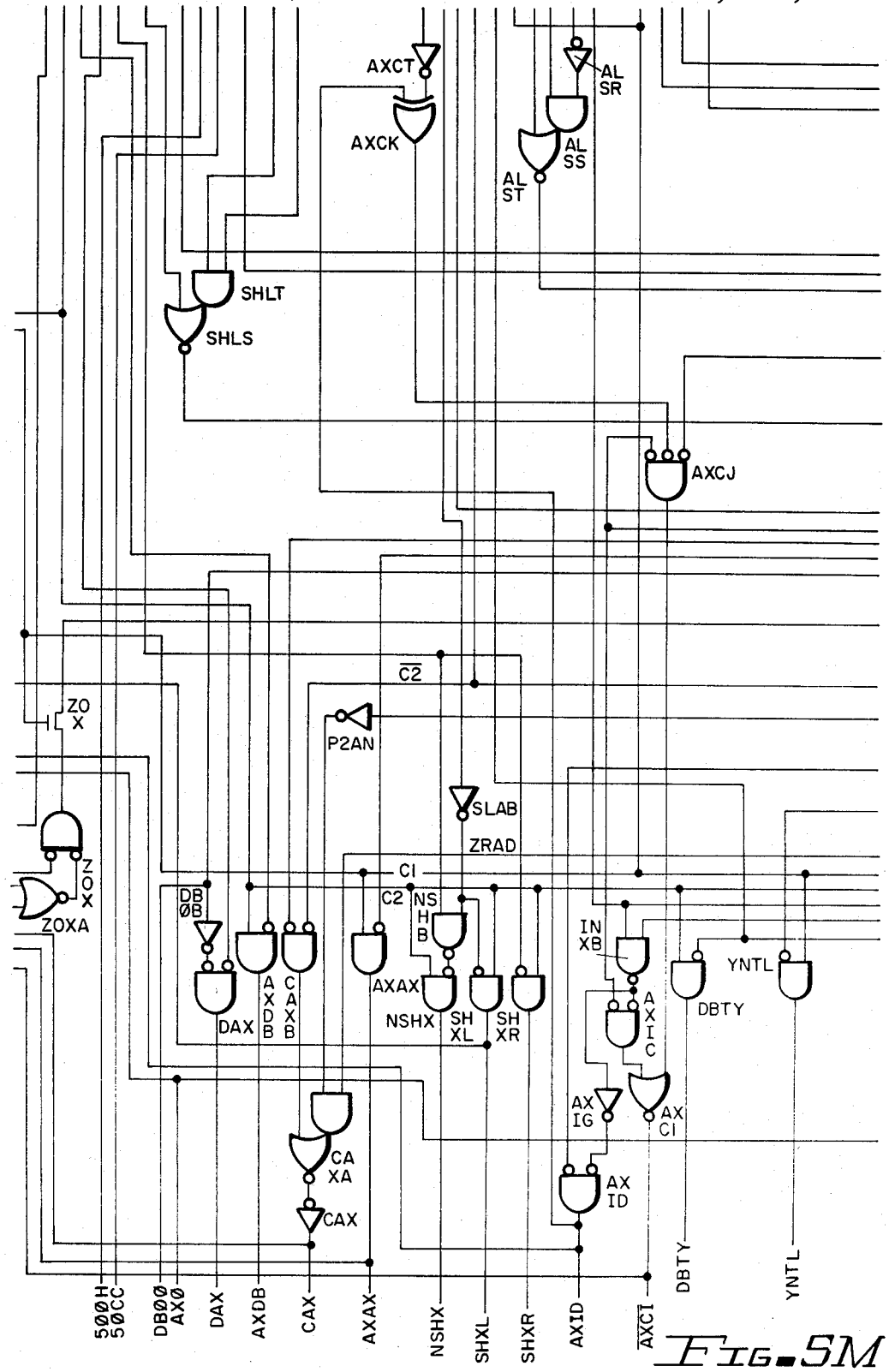

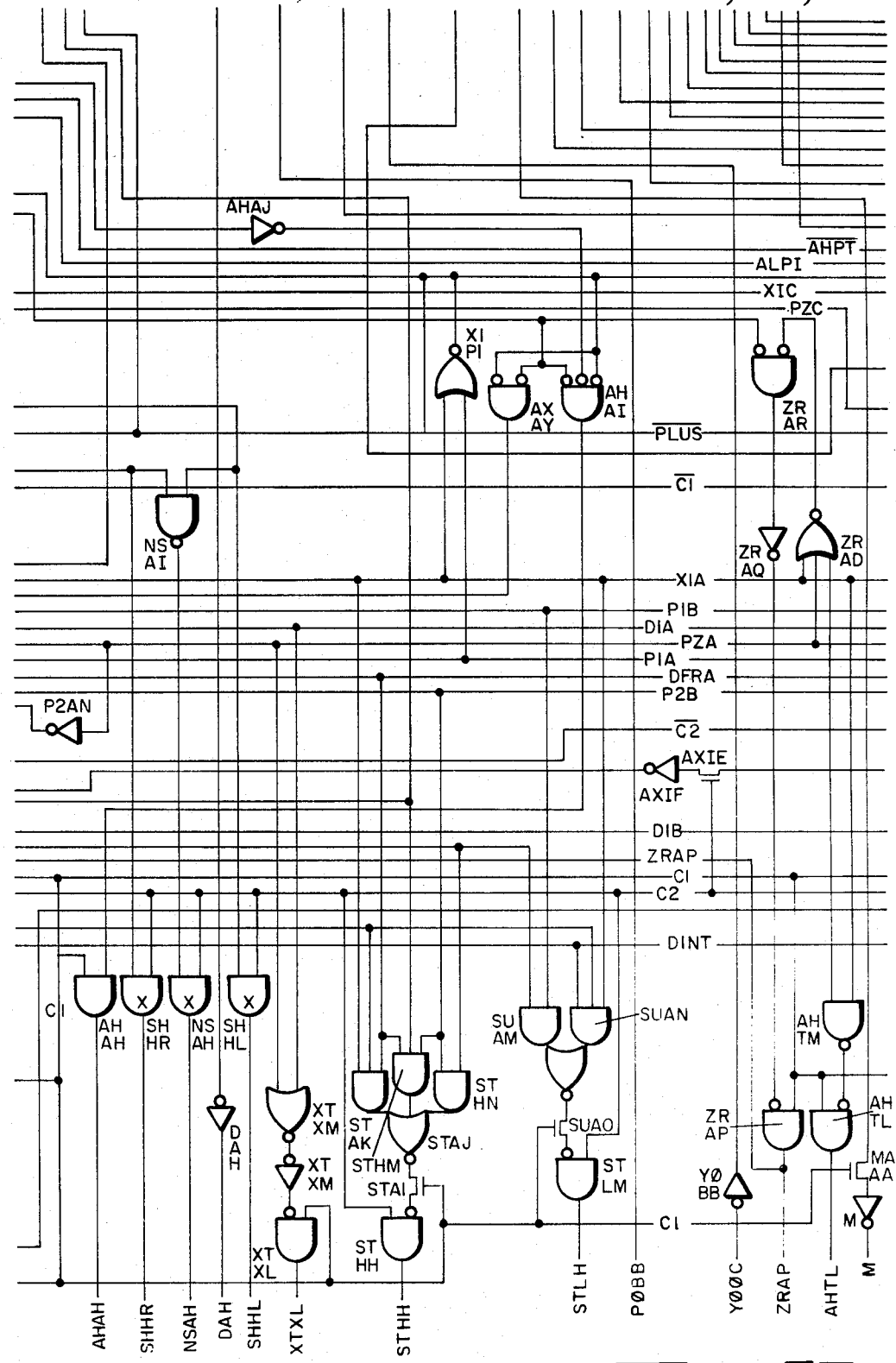
Fig. SP

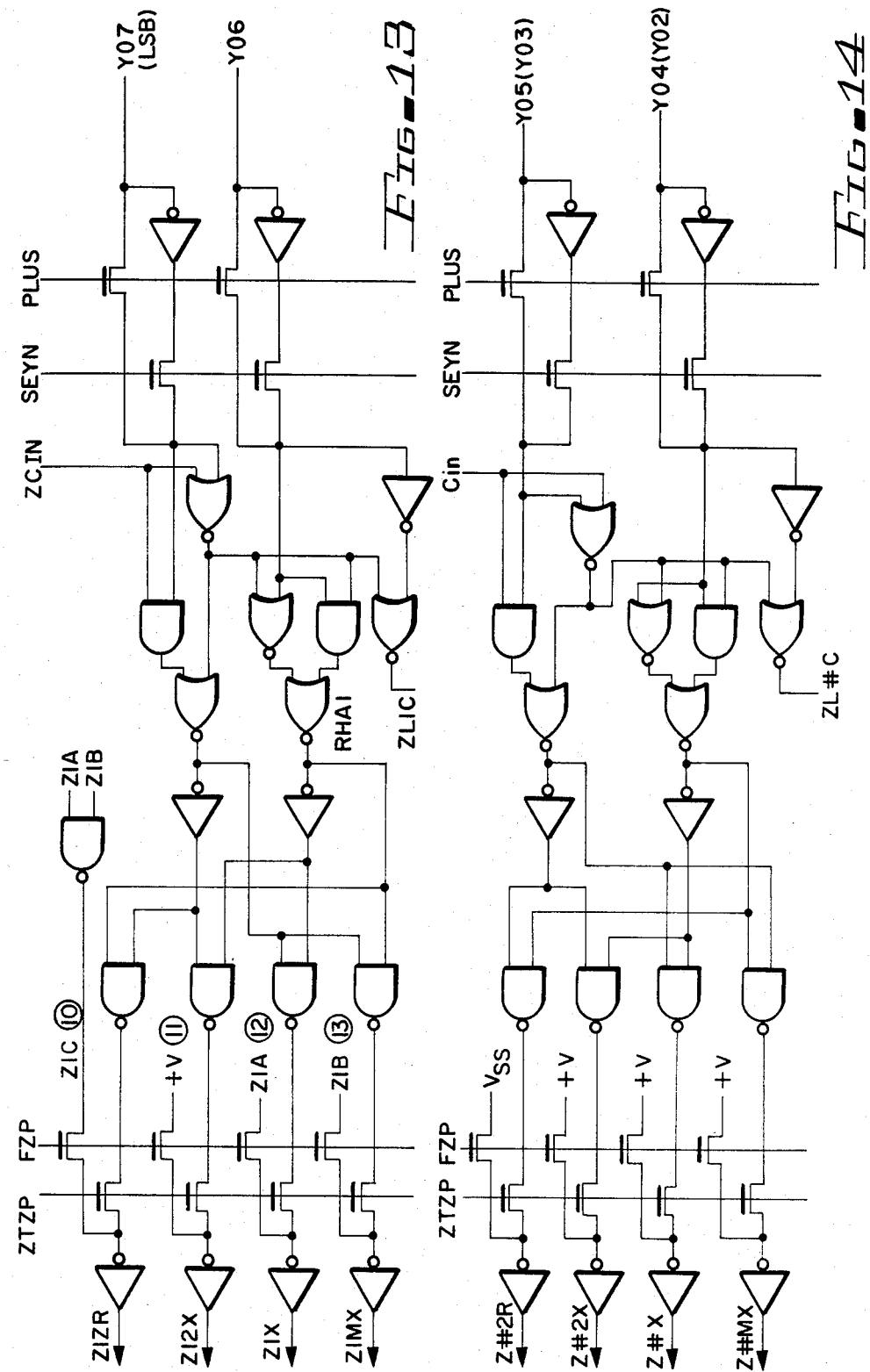

TWO-PASS MULTIPLIER/ACCUMULATOR CIRCUIT

TECHNICAL FIELD

This invention relates generally to digital logic circuits, and, in particular, to a digital two-pass multiplier/accumulator circuit.

BACKGROUND OF THE INVENTION

The present invention concerns a circuit for performing high speed arithmetic and logical operations on digital data. The present invention is implemented on an integrated circuit which has utility, for example, in a high capacity, high function modulator/demodulator (modem). The invention, however, has utility in a broad range of digital systems, including digital computer systems and subsystems.

In the digital arithmetic technology it is a known problem that digital multiplication and division require complex circuitry and/or complex routines to execute. In the manufacture of high capability, high quality electronic equipment, it is often necessary to provide high speed digital multiplication and divide capability. For such equipment to be economically competitive demands that the manufacturer keep the component costs relatively low. Thus there is a pressing need for a relatively low cost circuit for performing high speed arithmetic operations, including multiplication and division.

In the digital signal processing art, there is also a significant need for a low cost circuit for quickly determining the maximum or minimum value in a sequence of digital numbers.

BRIEF SUMMARY OF INVENTION

Accordingly, it is an object of the present invention to provide an improved Two-Pass Multiplier/Accumulator Circuit.

It is also an object of the present invention to provide a Two-Pass Multiplier/Accumulator Circuit which performs its operations in a pipelined manner to achieve high speed operation.

It is a further object of the present invention to provide a Two-Pass Multiplier/Accumulator Circuit which is capable of determining the maximum or minimum value in a sequence of digital numbers.

These and other objects are achieved in accordance with a preferred embodiment of the invention by providing a digital circuit for performing arithmetic and logical operations, such circuit comprising at least one operand register for storing an operand; an accumulator register for storing results of such arithmetic or logical operations; an array of N full adders each having an input and an output; and control logic for controlling the adder array to operate at least twice consecutively upon the contents of the accumulator register.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram illustrating a preferred embodiment of a Two-Pass Multiplier/Accumulator Circuit of the present invention.

FIG. 3 shows a block diagram illustrating in greater detail the structure and operation of the Adder 34 and Z Register 30 of FIG. 1.

FIG. 4 shows a block diagram illustrating in greater detail how data flows through the Adder 34 of FIG. 1.

FIG. 10 shows a detailed logic diagram of the basic P Register cell of which the P Register 26 is constructed.

FIG. 13 shows a detailed logic diagram of the basic Z Register (Level 1) cell of which a portion of the Z Register 30 is constructed.

FIG. 14 shows a detailed logic diagram of the basic Z Register (Levels 2,3) cell of which a portion of the Z Register 30 is constructed.

Figure 2A:
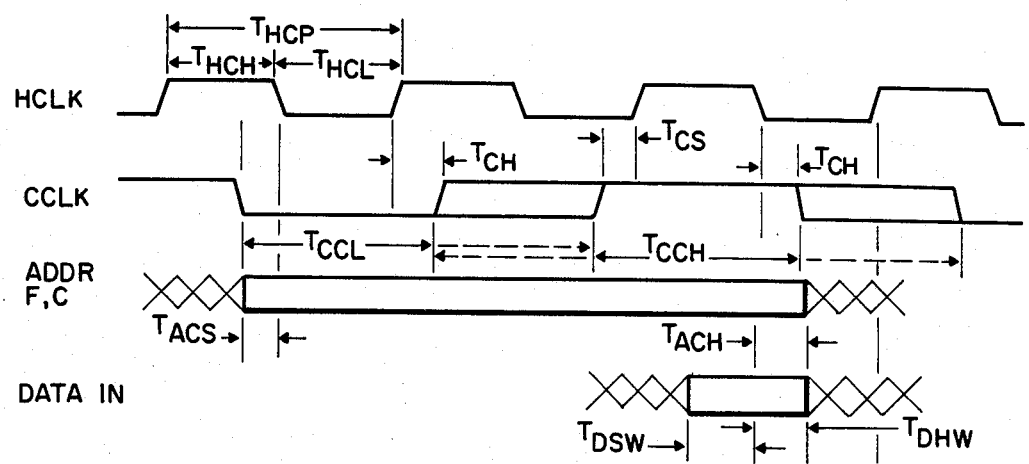
FIG. 2A shows a timing diagram illustrating the clock timing for the Synchronous Mode (Minimum Cycle Time) of the Multiplier/Accumulator of the present invention.

TABLE 1 illustrates the M/A Register bit weights for both the INTEGER mode and the FRACTION mode.

TABLE 2 illustrates the various M/A Register functions.

TABLE 3 illustrates the possible results of the RDAHL and RDALL functions in the INTEGER mode and the FRACTION mode.

TABLE 4 illustrates the various M/A Register operations.

TABLE 5 illustrates the various M/A control inputs.

TABLE 6 illustrates the M/A control sequence regarding FIGS. 3 and 4.

GENERAL DESCRIPTION OF THE INVENTION

The Multiplier-Accumulator-RAM circuit (MAR) contains a 16-bit Multiplier/Accumulator (M/A) 1 and a 256-word by 16-bit Random-Access-Memory (RAM) 50 with control circuitry to execute an extensive set of arithmetic and logic functions on data contained in the on-chip RAM or in external devices, as well as a large variety of data transfers between the internal parts of the chip (M/A and RAM) and other external devices. A functional block diagram of the MAR is shown in FIG. 1. This diagram is functional only; and the actual implementation may vary.

DETAILED DESCRIPTION OF THE INVENTION

TABLE OF CONTENTS

MULTIPLIER/ACCUMULATOR/RAM COMPONENTS
OPERATING MODES
  Plus/Minus
  Integer/Fraction
  Mode Reverse
  Magnitude
  Accumulate
FUNCTIONS
  Read Group
  Load Y Register Group
  Load X Register Group
  Load A Register Group
  Load Mode Register
OPERATIONS
  Multiply Group
  Delayed Multiply Group
  Add/Subtract
  Compare/Maximum/Minimum
  Sign Modification Operations
  Logical Operations
  Divide
  Difference
CONTROL INPUTS
STATUS BITS
TIMING
  Synchronous Mode
  Asynchronous Mode
  Synchronous-Asynchronous Mode Switching
PROGRAMMING EXAMPLES
OPERATION OF PREFERRED EMBODIMENT
  Operation of Digital Multiplier/Accumulator
  Operation of Pipelined Multiplier
  Operation of Arithmetic Unit Having Maximum/Minimum Operations

Multiplier/Accumulator/RAM Components

The Multiplier/Accumulator portion 1 of the circuit forms the arithmetic product of two 16-bit numbers contained in registers X and Y, and adds or subtracts this product to or from a 40-bit Accumulator 40 (AX, AH, AL). The M/A can also perform the logical operations AND and EXCLUSIVE OR on the contents of X and AH or AL, and it can shift the entire 40-bit Accumulator contents left or right for normalization, or for multiplication or division by 2. Except for the logical operation, all data are treated as signed numbers using two's-complement notation. A software-controlled mode allows the data to be treated as integers or fractions. The M/A is controlled by the F(0-4) function inputs when enabled by the proper C(0-4) control inputs.

The RAM 50 is a 256-word, 16-bit/word static random access memory. It interfaces internally with the M/A 1 and data port 11 via buffer 3. The RAM is addressed by the 8-bit Address input A(0-7) and controlled by the C(0-4) and F(0-4) inputs.

The 16-bit tri-state data port 11 via internal data busses 7, 5 and 15 can connect to a 16-bit external data bus (not shown) for transfer of data into or out of the MAR.

The 16-bit X Register 10 holds one of the operands for all operations (except Shift A).

The 16-bit Y Register 20 holds the second operand in Sign Multiply and all ordinary Multiply operations.

Registers X and Y may be loaded but not read by software.

The Adder 34 actually comprises 4 adders cascaded (see adder elements 101-104, FIG. 3), and the Z Register 30 actually comprises a 4-level register (elements 111-114, FIG. 3). The function and operation of Adder 34 and Z Register 30 will be described in greater detail hereinafter.

The 5-bit input C(0-4) to Control Decode 60 controls the routing of data between the M/A, the RAM, and the data bus 15.

The 5-bit input F(0-4) to Function Decode 70 provides 32 M/A functions, including multiply with or without accumulation, add, subtract, compare, absolute value, X.sign of Y, negate, divide, maximum, and minimum.

The 40-bit Accumulator 40 receives the results of all operations. The Accumulator 40 comprises a 32-bit accumulator proper comprising portions AH and AL, and an 8-bit accumulator extension (AX). AX provides for accumulated results which exceed the 32-bit capacity of the accumulator proper. AX can be read but not explicitly loaded; it is initialized according to the sign of any value loaded into the accumulator proper. The 32-bit accumulator proper is further subdivided into two 16-bit halves designated AH (high or most-significant) and AL (low or least-significant) in order to provide for communication with the 16-bit RAM 50 and DB 5. AH and AL can be loaded or read under program control.

Status Register 44 contains five status bits which indicate that the current contents of the Accumulator are zero, negative, unnormalized, or overflowed at the boundaries of AH or AL. A sixth bit indicates that AX has overflowed at some previous operation, and thus that the Accumulator contents may not be valid. A seventh bit indicates the relative values in A and X following a Compare, Max or Min operation. The status word can be read under program control.

Mode Register 42 is a 5-bit register which controls four operating modes of the MAR. These are (1) fractional or integer arithmetic, (2) magnitude or algebraic comparison, (3) accumulation for two specific operations, and (4) reversal of the PLUS/MINUS mode. The PLUS/MINUS mode is a separate mode controlled by the Load Y function but which may also be affected by the Mode Register. The modes may be independently controlled by program, and the Mode Register may also be read by program.

During one cycle of operation, the MAR decodes the Control and Function inputs, and if so directed, performs a data transfer and a function. In general, the C input controls the data transfer between the RAM, M/A, and DB, and the F input specifies the register in the M/A which is to be read or loaded and the function to be performed in the M/A 1. The function may consist of setting modes or setting or starting an operation. Operations take place during the cycle or cycles following the execution of the function, operating on the data in X, Y, and A, and usually placing the result in A. Except for the logical operations (AND and EOR), all data are treated as fixed point, two's-complement signed numbers, in either integer or fraction representation. The integer or fraction interpretation is controlled by a mode bit. The most-significant bit of X, Y, or AX indicates the sign of x, Y, or the entire 40-bit Accumulator. The bit-weighting of all registers is shown in Table 1 for integer and fraction representation.

The X and Y registers are fully buffered so that additional data transfers and functions may be performed while an operation is in progress in a "pipeline" fashion. For example, in doing a multiply-accumulate of the form, $A = X1 \cdot Y1 + X2 \cdot X2 + \cdots$, two operands can be loaded, while the previous operands are being operated upon. This is described in greater detail below in the section below entitled "Pipelined Multiplier".

Operating Modes

There are five mode bits in the M/A that affect various functions and operations.

(1) PLUS/MINUS

PLUS/MINUS is set to PLUS or MINUS by specified Load Y functions. MINUS mode effectively causes the data in the Y register to be negated, thus operating with the value $(-Y)$ except for the difference operation. The Y register itself is not affected.

(2) INTEGER/FRACTION (INTG/FRAC)

INTEGER/FRACTION is set by the Load Mode Register function and specifies whether data are to be operated on as integers or fractions. In general, results of multiplications operations are shifted left one bit in FRAC mode, and single-word operations use AH in FRAC mode or AL in INTG mode.

(3) MODE REVERSE (MREV)

MODE REVERSE is set by the Load Mode Register function. MREV affects only the LDYPM function. LDYPM sets PLUS mode if MREV=0, or MINUS mode if MREV=1.

(4) MAGNITUDE (MAG)

MAGNITUDE is set by the Load Mode Register function. MAG affects only the Compare, Maximum, and Minimum operations. When MAG=0, an algebraic (signed) comparison is made between X and A. When MAG=1, the absolute values (magnitudes) of X and A are compared.

(5) ACCUMULATE (ACC)

ACCUMULATE is set by the Load Mode Register function. ACC affects only the Absolute Value and Multiply by sign of Y operations. When ACC=0, these operations clear the Accumulator and place the new results into it. When ACC=1, these operations add the new results to the previous Accumulator contents.

Functions

The Function input specifies a register to be loaded or read and the function to be executed within the M/A for each cycle. The functions consist of:

(a) Setting modes—LDY and LDMR functions.
(b) Starting arithmetic or logical operations—LDX functions.
(c) Setting delayed arithmetic operations—LDX functions.
(d) Starting delayed operations—LDA and RDA functions.
(e) Shifting the Accumulator—ASL and ASR functions.
(f) Reading results—RDA and RDST functions.

The function is completed within one cycle, but the operation takes place during a subsequent cycle or cycles. Note that the shift A functions are not classed as operations.

The Functions are listed in Table 2. The Functions can be organized into Read Group, Load Y Register Group, Load X Register Group, Load A Register Group, and Load Mode Register Group, each of which will now be discussed:

| Read Group | |
|---|---|
| RDAL RDAH RDAX | Read Accumulator Low/High/Extended - transfers the designated portion of the Accumulator (AL, AH, or AX) to the internal data bus 15. AX is placed on the least significant 8 bits of the bus, with its most-significant bit extended across the most-significant 8 bits of the bus. |
| RDALL RDAHL | Read Accumulator Low/High Limited - normally reads the Accumulator (AL or AH), but if an overflow is indicated, places the maximum positive or negative number on the internal data bus, thus providing an output that is limited to the maximum magnitude available in one or two 16-bit words. The limit value is determined by the mode and the current sign of A (N status bit). Two results are possible in Integer mode, depending on whether AH or AL is read first. A latch, FSRD (first read), is set by an LDX function and cleared following any RDALL or RDAHL. In Integer mode, if RDALL occurs first, the limit will be a one-word value based on VL; if RDAHL occurs first, the limit will be a two-word value based on VH. In Fraction mode, the limit is always a one- or two-word value based on VH. |

Table 3 shows the possible results of these two functions.

In addition to the data transfers stated above, if a Delayed Multiply or a Delayed Multiply-Round operation is pending, it will be started as follows:
INTG mode: RDAL or RDALL starts operation.
FRAC mode: RDAH or RDAHH starts operation.

| | |
|---|---|
| RDST | Read Status - places the status word onto the internal data bus in the most-significant 7-bit positions. The Mode Register is also placed in the 8 least-significant bit positions. |
| ASL ASR | Shift Accumulator Left/Right - Shifts the entire Accumulator contents (40 bits) left or right one bit. ASL inserts a zero on the right of AL: ASR extends the sign bit on the left of AX. These functions are not true reads, but are grouped with the read functions. The Accumulator contents are not placed on the data bus. |
| | Load Y Register Group |
| LDYP LDYM LDYPM | Load Y Register and set PLUS/MINUS mode - transfers the internal data bus contents to the Y Register and sets the PLUS or MINUS mode as follows: |

| | Resulting Mode | |
|---|---|---|
| Function | MREV = 0 | MREV = 1 |
| LDYP | PLUS | PLUS |
| LDYM | MINUS | MINUS |
| LDYPM | PLUS | MINUS |

| | |
|---|---|
| LDYDIF | Load Y Register and set Difference operation - transfers the internal bus contents to the Y Register and sets a control latch that will subsequently activate the difference operation. The PLUS/MINUS mode is not affected. An LDYP, LDYM, or LDYPM function executed after an LDYDIF, but before the difference operation has been activated, cancels the difference operation. |

Load X Register Group

All LDX functions transfer the internal data bus contents to the X Register and either start an operation or set a delayed operation. The delayed operations are started following a subsequent LDA or RDA function. The other functions are executed immediately following the LDX function.

| Load A Register Group |
|---|
| LDAL<br>LDAH | Load Accumulator Low/High - transfers the internal data bus to AL or AH. In addition, on the first Load A following any LDX, the other half of A is automatically cleared or filled with the extended sign. AX is filled with the extended sign on any LDAH. A latch, FSLD (First Load) is set by any LDX function and cleared following any LDAH or LDAL. The results of the LDA's are as follows: |

|       | FSLD | AX       | AH       | AL        |
|-------|------|----------|----------|-----------|
| LDAL: | 1    | sign extended      || new data  |
| LDAH: | 0    | sign ext.| new data | unchanged |
| LDAH: | 1    | sign ext.| new data | zero      |
| LDAL: | 0    |          | unchanged| new data  |

Thus single-precision operands may be loaded with a single function (LDAL or LDAH). When FSLD=1, the entire Accumulator will be properly initialized. A second LDA before another LDX (FSLD=0) will not affect the word already loaded, thereby providing the capability to load double-precision operands. AX, however, cannot be explicitly loaded, and will always contain the correct extended sign.

In addition to the data transfers, if a Delayed Multiply-Accumulate operation is pending, it will be started as follows:
INTG mode: LDAL starts operation.
FRAC mode: LDAH starts operation.

Load Mode Register
LDMR—Sets or clears individual mode bits as indicated by the data on the internal data bus. Bits 00 to 07 of the data word specify which mode bits are to be affected and in what manner. Each bit is independently specified, and any combination of setting and clearing modes can be accomplished with one function.

| Internal Data Bus Bits ||||||||  |
|----|----|----|----|----|----|----|----|---|
| 07 | 06 | 05 | 04 | 03 | 02 | 01 | 00 | Function |
| 0  | —  | —  | —  | —  | —  | —  | —  | MAG not affected |
| 1  | 0  | —  | —  | —  | —  | —  | —  | Clear MAG mode |
| 1  | 1  | —  | —  | —  | —  | —  | —  | Set MAG mode |
| —  | —  | 0  | —  | —  | —  | —  | —  | ACC not affected |
| —  | —  | 1  | 0  | —  | —  | —  | —  | Clear ACC mode |
| —  | —  | 1  | 1  | —  | —  | —  | —  | Set ACC mode |
| —  | —  | —  | —  | 0  | —  | —  | —  | INTG/FRAC not affected |
| —  | —  | —  | —  | 1  | 0  | —  | —  | Set INTG mode |
| —  | —  | —  | —  | 1  | 1  | —  | —  | Set FRAC mode |
| —  | —  | —  | —  | —  | —  | 0  | —  | MREV not affected |
| —  | —  | —  | —  | —  | —  | 1  | 0  | Clear MREV |
| —  | —  | —  | —  | —  | —  | 1  | 1  | Set MREV mode |

The mode bits are internally buffered so that executing an LDMR function while a previously-initiated operation (other than DIFFERENCE or DIVIDE) is in progress will not affect the in-progress operation, but will be effective on any subsequent function or operation. Also, if the Mode Register is loaded directly from A (Am to R transfer), the selection of AH or AL as the source will be determined by the previous state of the FRAC/INTG mode.

The FRAC/INTG mode should not be changed during a DIVIDE operation except during the last cycle or incorrect results will be obtained. The other mode bits do not affect DIVIDE and therefore may be changed during the operation.

If an LDMR function is executed while the DIFFERENCE operation is in progress, such as in the sequence
LDYDIF,LDXMPY,LDMR, - - -
the mode change will be effective for the operation that follows DIF (MPY in this example). Note, however, that if the LDMR is delayed, such as by an interrupt, the multiply will occur before the LDMR is executed, thus giving different results if the FRAC/INTG mode is changed.

Note that the Read Status operation also places the Mode Register contents on the internal data bus with 1's in bit positions 01, 03, 05 and 07. Therefore, executing an LDMR with the data previously read by an RDST will restore the Mode Register to its state as of the time the RDST was executed.

Operations

Operations take place on the data in the registers after certain functions have been executed. Each operation is initiated by a specific function and takes place during the cycle or cycles immediately following the execution of the function without further control or function inputs. Other data transfers and/or functions may be executed while an operation is in progress with the following restrictions:

Load A or shift A functions will, in general, destroy the result of the operation.

Read A functions except RDAX will give invalid data with specific exceptions noted below.

A function that initiates a new operation may not be executed until the last cycle of the previous operation or neither will execute properly.

The FRAC/INTG mode of X Register may not be changed during a DIVIDE prior to the last cycle.

AL is correct after one cycle of the following operations and may therefore be read during the second cycle under the specified conditions only:

| ADD, SUB<br>all multiples if $|Y| \leq 127$<br>ABS, MSY with ACC = 1 | INTG mode only |
|---|---|

AH and AL are not affected during the following operation cycles and may therefore be read correctly. They will contain the results of a previous operation.

| CMP - one-cycle operation<br>MAX, MIN - first cycle only | INTG mode only |
|---|---|

The operations are summarized in Table 4. Examples of various function sequences and operation execution are given in the section below entitled "Programming Examples".

Specific information concerning the various categories of M/A operations follow.
Multiply Group
MULTIPLY The product X*Y in PLUS mode or −X*Y in MINUS mode is formed and placed in the Accumulator. The previous contents of the Accumulator are ignored and are destroyed. This operation takes two cycles.

MULTIPLY-ROUND

The product is formed as in MULTIPLY, but in FRAC mode it is added to the quantity $2^{-16}$. The resulting value in AH is X*Y (or −X*Y) rounded to a one-word (16-bit) value. That is, if the most-significant bit in AL due to a MULTIPLY operation in FRAC mode would have been a 1, the MULTIPLY-ROUND operation will produce a value in AH which is rounded to the next higher number than would have been produced by the MULTIPLY. In INTG mode, MULTIPLY-ROUND is the same as MULTIPLY. This operation takes two cycles.

MULTIPLY-ACCUMULATE

The product is formed as in MULTIPLY but it is added to the previous contents of the Accumulator. In FRAC mode, the least-significant bit of AL is ignored, and is forced to 0 in the result. A full 40-bit accumulation is performed. If an overflow of AX occurs, the VX latch will be set to 1.

Delayed Multiply Group

DELAYED MULTIPLY—DELAYED MULTIPLY-ROUND

These operations produce the same results as their counterparts. However, they are not started following the LDX function, but instead following a subsequent RDA function. This permits loading two operands while a previous MULTIPLY operation is in progress, then reading the previous result before starting the new operation. The function that starts these delayed operations is determined by the mode as follows:

INTG mode: RDAL or RDALL starts operation.
FRAC mode: RDAH or RDAHL starts operation.

This permits reading a single-precision or double-precision result of the previous operation by reading AH and/or AL in the appropriate order. These operations take two cycles.

DELAYED MULTIPLY-ACCUMULATE

This operation produces the same result as its counterpart. However, the operation is not started following the LDX function, but following a subsequent LDA function. This permits a calculation of the form Z=(X*Y)+W where the X and Y values can be loaded while a previous operation is in progress, the previous result can be read, and then the value W can be loaded into A. This operation is started according to the mode as follows:

INTG mode: LDAL starts operation.
FRAC mode: LDAH starts operation.

This permits loading A with a single-precision or double-precision value by loading AH and/or AL in the appropriate order. This operation takes two cycles.

Delayed operations are latched in the MAR during an LDX function and remain latched until executed or until a subsequent LDX occurs. If an LDX is executed while a delayed operation is pending, the pending operation is cancelled and the operation indicated by the new LDX is executed or, if it is a delayed operation, it is latched cancelling the previous pending operation.

Add, Subtract

ADD and SUBTRACT are exactly equivalent to the MULTIPLY-ACCUMULATE operation with Y=1 or −1, but are independent of the PLUS/MINUS mode. However, the contents of Y are ignored and are not affected. The value in X (integer or fraction) is added to or subtracted from the 40-bit Accumulator. In FRAC mode, the least-significant bit of AL is ignored, and is forced to 0 in the result. If an overflow of AX occurs, the VX latch will be set. These operations take two cycles in INTG mode, one cycle in FRAC mode.

Compare, Maximum, Minimum

The Compare operation compares the contents of X with AH (FRAC mode) or AL (INTG mode). Only 16 bits are compared, and the remaining bits in the Accumulator are ignored. The Accumulator and X Register remain unchanged. The result of the comparison is indicated in the S bit of the status word.

Two types of comparison are available. The MAG mode bit determines whether the algebraic (signed) values are compared or the magnitudes (absolute values) are compared. The meaning of the S bit is as follows:

|  | S = 0 | S = 1 |
|---|---|---|
| MAG = 0 | X ≦ Am | X > Am |
| MAG = 1 |  |  |
| A ≧ 0 | \|X\| ≦ \|Am\| | \|X\| > \|Am\| |
| A < 0 | \|X\| < \|Am\| | \|X\| ≧ \|Am\| |

The notation Am is used throughout this description to mean AH if FRAC mode or AL if INTG mode.

Note that equality is not explicitly indicated and that in the magnitude comparison, the case where |X|=|Am| will give either S=0 or S=1, depending on the algebraic sign of A. Note also that since only 16 bits of A are involved in the comparison, valid results relative to the entire Accumulator are obtained only if:

VX=VH=0 in FRAC mode, or
VX=VH=VL=0 in INTG mode.

Provided the above condition is met, the comparison in FRAC mode gives valid results relative to the entire Accumulator even though AL is not included in the comparison. If a test for exact equality is necessary, the subtract operation should be used, and the Z status bit tested.

The Compare operation takes one cycle. S remains as set until a subsequent Compare, Maximum or Minimum operation.

Maximum and Minium (MAX, MIN) are two-cycle operations. During the first cycle, a Compare is performed exactly as described above. In addition, the contents of AX are incremented by one (IF AX=−1 [all 1s] and VX=0, AX and An are first cleared to 0.) In the second cycle, depending upon the result of the Compare, as indicated by the S bit, the contents of X and AX may be transferred to the Accumulator (AH, AL only) as follows:

|  | S = 0 | S = 1 |
|---|---|---|
| MAX | No Transfer | X → Am |
|  |  | AX → An |
| MIN | X → Am | No Transfer |
|  | AX → An |  |

Where
Am=AH in FRAC mode, AL in INTG mode;
An=AL in FRAC mode, AH in INTG mode.

Thus Am will contain the maximum (MAX) or the minimum (MIN) of the two values compared, and An indicates which of the two operands is in Am. After a series of MAX or MIN operations, preceded by a Load Am, Am will contain the maximum or minimum value, and An will contain an index to that value as follows:

An=0: Am contains original value loaded into Am
An=i: Am contains the $i^{th}$ value loaded into X (i=1, 2, 3, ...)

The most-significant 8 bits of An will be cleared to 0 when AX is transferred. In FRAC mode, the least-significant bit of AH is forced equal to the most-significant bit of AL (normally 0), regardless of the S-bit.

Sign Modification Operations

These operations multiply the contents of X by +1 or −1 and place the result in the Accumulator. If the accumulate mode is set (ACC=1), ABS and MSY add the result to the previous Accumulator contents. The PLUS/MINUS mode affects only the MSY operation.

Negate (NEG)—Places the value (−X) in the Accumulator independent of modes. NEG takes one cycle.

Absolute Value (ABS)—If ACC=0, places the value of |X| in the Accumulator; if ACC=1, adds the value |X| to the Accumulator. In INTG mode, with ACC=1, ABS takes two cycles; otherwise it takes one cycle.

Multiply by Sign of Y (MSY)—The contents of X are multiplied by +1 or −1 according to the value in Y and the PLUS/MINUS mode as follows:

|  | PLUS | MINUS |
| --- | --- | --- |
| Y ≧ 0 | +1 | −1 |
| Y < 0 | −1 | +1 |

The result is placed in the Accumulator if ACC=0, or added to the Accumulator if ACC=1. In INTG mode, with ACC=1, MSY takes two cycles; otherwise it takes one cycle.

Logical Operations

The logical operations are performed bit by bit on the value in X and the value in AH in FRAC mode or AL in INTG mode, with the result replacing AH or AL, respectively. Sixteen bits from each register are involved in the operation, each treated as a logical quantity. However, the status word indicates the status of A treated as a numerical quantity. The logical operations are defined as follows:

| Operand Bit | | Result Bit | |
| --- | --- | --- | --- |
| X | A | AND | EXOR |
| 0 | 0 | 0 | 0 |
| 0 | 1 | 0 | 1 |
| 1 | 0 | 0 | 1 |
| 1 | 1 | 1 | 0 |

LOGICAL AND −X AND (∧) AH or AL placed in AH or AL. AX and AL or AH, respectively, are cleared to zero.

LOGICAL EXCLUSIVE OR −X EXOR (⊕) AH or AL placed in AH or AL. AX and AL or AH, respectively, are cleared to zero.

These operations take one cycle.

Divide

The DIVIDE operation performs the kernel of a non-restoring division algorithm. The operation is defined for FRAC mode only, but is independent of the PLUS/MINUS mode. The results are not defined for INTG mode. DIVIDE performs the following steps sixteen (16) times:

(1) The most-significant bit of AH is saved in a latch, M.
(2) If M=0, one-half the value in X is subtracted from AH, AL; if M=1, the same quantity is added to AH, AL. All 16 bits of X are used in this operation—no precision is lost.
(3) AH, AL are shifted left one place inserting $\overline{M}$ into the least-significant bit of AL.

If the initial contents of A and X are:
A≧0, AX=0 (no overflow of AH), X>A,
then the final Accumulator contents are:
AL=(A+X)/X rounded low
AH=[Remainder of (A+X)/X]−X
AX=extended sign of AH (all 0's or 1's).

The divide operation takes 16 cycles.

Difference Operation

The different operation is a special operation that may be executed in conjunction with any of the following operations:

MPY, MPR, MAC, DMP, DMR, DMA, CMP, MAX, MIN, ABS or DIV.

It is specified by the LDYDIF function. The first one of the above operations to be executed following an LDYDIF will be preceded by the difference operation. DIF requires one cycle in addition to the normal operation execution. It replaces the data in X and Y with the value (Y/2−X/2), where the least-significant bit of X and of Y are ignored (X/2 and Y/2 rounded down).

The difference operation will remain pending following an LDYDIF function until it is executed or another LDY function is executed. Other functions or operations intervening do not affect the pending difference operation. Only one difference operation is executed per LDYDIF function.

The DIF operation is executed during the cycle immediately following the LDX function that specifies one of the above operations, including the delayed multiplies. Except for the delayed multiplies, the normal function occurs immediately following DIF. The delayed multiplies are activated in the same manner independent of the DIF operation. At the time the delayed operation is activated, the DIF will have been completed.

The DIF operation does not utilize the internal data bus 15 and does not affect the Accumulator 40. Therefore other data transfers may be made during the DIF execution. An LDX or LDY function executed while DIF is executing will override the (Y/2−X/2) transfer to that register only, thus permitting the difference to be operated upon along with a third value, such as the following sequence:

LDYDIF Y
LDXMPY X
LDXMPY Z
NO-OP
NO-OP
READ A

The result is (Y/2−X/2) * Z.

However, the following sequence is not permitted due to timing limitations:

LDYDIF
LDXMPY or LDXMPR or LDXMAC
LDY - - -

Control Inputs

Overall control of the MAR is exercised by the Control inputs C(0-4). They include enables for the M/A and the RAM and, in conjunction with the Function inputs, they control data transfers among the M/A registers, RAM, and Data Bus 5. The Control input signals have the following designations and primary functions:

FE (Function Enable)—Enables the Function inputs subject to certain other control inputs. When this signal is false the Function inputs are ignored and no function is performed.

IM (Internal Memory)—In general, enables the on-chip RAM for reading or writing.

EM (External Memory)—Enables external memory if IM=0. In the MAR, this input provides miscellaneous data routing control.

RD (Read)—For DB-Memory transfers not involving the M/A, indicates a memory read. For other cases, this input provides miscellaneous data routing control.

CE (Chip Enable)—In general, acts as a chip enable; however, the chip may be enabled under certain control combinations in which CE is false.

The definitions given above are general in nature. All five control inputs are decoded to enable specific data transfer and functions. The complete definition of the control inputs is given in Table 5.

Status Bits

There are seven status bits. N, U, Z, VH and VL are direct indications of the current Accumulator contents. VX and S are latches that indicate results of a previous operation. The status is read via the Read Status (RDST) function, which places the status bits on the most-significant portion of the internal data bus and the Mode Register contents on the least-significant portion. The status word appears as follows:

| 15 | | | | | | | | 08 | 07 | | | | | | 00 |
|---|---|---|---|---|---|---|---|---|---|---|---|---|---|---|---|
| N | U | Z | VX | VH | VL | S | 1 | 1 | MAG | 1 | ACC | 1 | FRAC | 1 | MREV |

The meaning of the status bits is as follows:

| | |
|---|---|
| N (Negative): | Most-significant bit of AX = sign of Accumulator (0 = +, 1 = −). |
| U (Unnormalized): | The Accumulator is considered normalized (U + 0) when: The two most-significant bits of AH are different (01 or 10) and VH = 0 (no overflow of AH). |
| Z (Zero): | Accumulator = 0 (all 40 bits = 0) |
| VX (Overflow of AX): | If any operation results in an AZ value greater than 7F or less than 80 (hexadecimal), the VX latch is set (VX = 1). VX is cleared to 0 by any load A function or by the following operations: MPY, MPR, DMP, DMR, NEG, AND, EOR, or ABS, MSY with ACC = 0. |
| VH (Overflow of AH): | An AH overflow is indicated (VH = 1) unless one of the following conditions exists: AX = all 0s and MS bit of AH = 0. or AX = all 1s and MS bit of AH = 1. |
| VL (Overflow of AL): | An AL overflow is indicated (VL = 1) unless one of the following conditions exists: AX = AH = all 0s and MS bit of AL = 0 or AX = H = all 1s and MS bit of |

-continued

| | |
|---|---|
| | AL = 1. |
| S (Sign of last Compare) | The sign bit of the result of a Compare, Maximum, or Minimum operation is placed in the S latch. It remains until a subsequent Compare, Maximum, or Minimum. |

VH and VL are indications of the current status of the 40 bits of A and are independent of the VX indication. VX indicates that an unrecoverable overflow has occurred, and therefore, all other status bits (except S) may be invalid. Note also that if VL=0, then necessarily, VH also =0.

Timing

Timing of the MAR is controlled by two clock signals supplied to the circuit, the high-speed clock (HCLK) and the cycle clock (CCLK). There are two timing modes determined by the AMODE input, synchronous mode (AMODE=low) and asynchronous mode (AMODE=high). HCLK is a continuous clock which must be supplied regardless of the mode. It runs at a multiple of the cycle frequency and is used to provide internal timing signals. CCLK is used to synchronize the internal timing to external events when necessary, and to initiate asynchronous internal functions. Data Transfer Acknowledge (DTA) is an output used in the asynchronous mode for handshaking with a host computer.

Synchronous Mode

The synchronous mode is used for maximum-performance operations. Synchronous mode is selected by applying a logic low to the AMODE input. AMODE may be connected directly to VSS if desired.

Figure 2B:
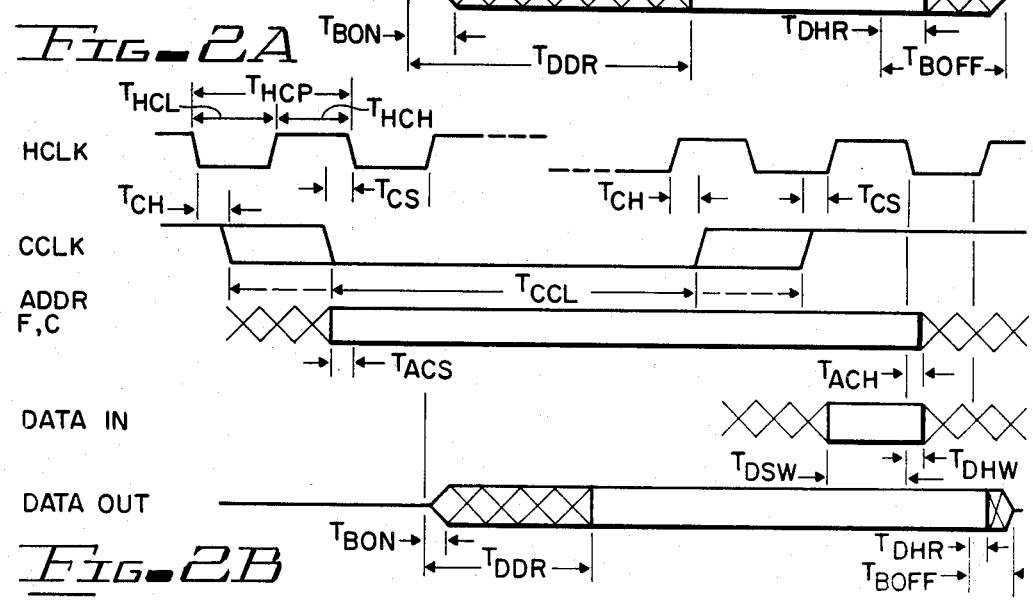
FIG. 2B shows a timing diagram illustrating the clock timing for the Synchronous Mode (Extended Cycle) of the Multiplier/Accumulator of the present invention.

FIGS. 2A and 2B show the timing for the MAR for minimum and extended cycles, respectively. CCLK must be supplied continuously in the synchronous mode.

In this mode, all timing is synchronized to HCLK, with CCLK indicating which edges of HCLK are significant. A cycle starts on the first low-going transition of CCLK. The cycle ends one full HCLK cycle after the first high-going transition of HCLK that follows the high-going edge of CCLK.

The minimum period of CCLK is three full cycles of HCLK, with a nominal 50% duty cycle. To extend the cycle, e.g., to transfer data to or from a slower device connected to the data bus, the low (active) phase of CCLK can be extended in multiples of one full cycle of HCLK. The start of the cycle may be delayed by extending the high phase of CCLK also in multiples of one full cycle of HCLK.

Asynchronous Mode

The asynchronous mode is used for operation with an asynchronous system, and has been designed specifically for connection to the Motorola M68000 microprocessor. Asynchronous mode is selected by applying a logic high to the AMODE input. AMODE may be connected directly to VDD if desired.

Figure 2C:
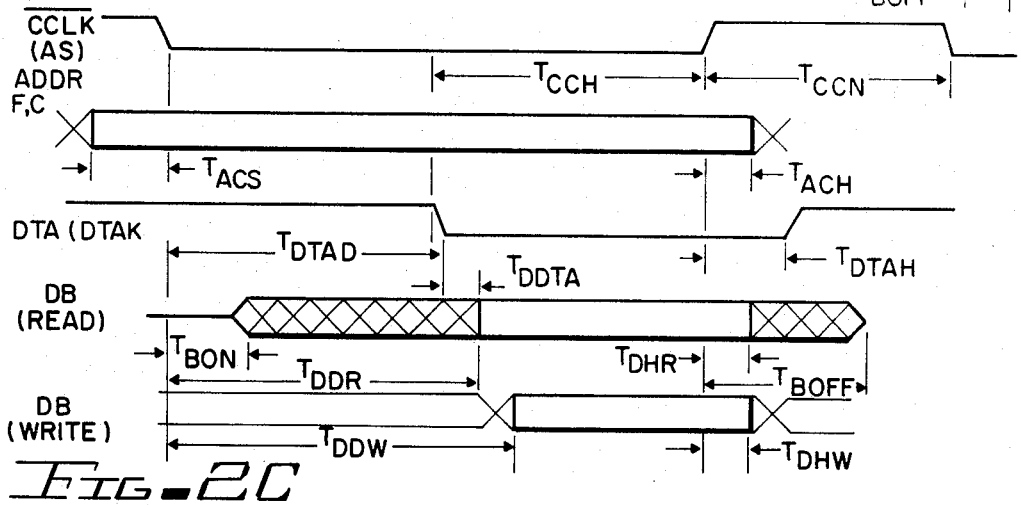
FIG. 2C shows a timing diagram illustrating the clock timing for the Asynchronous Mode of the present invention.
Figure 5A:
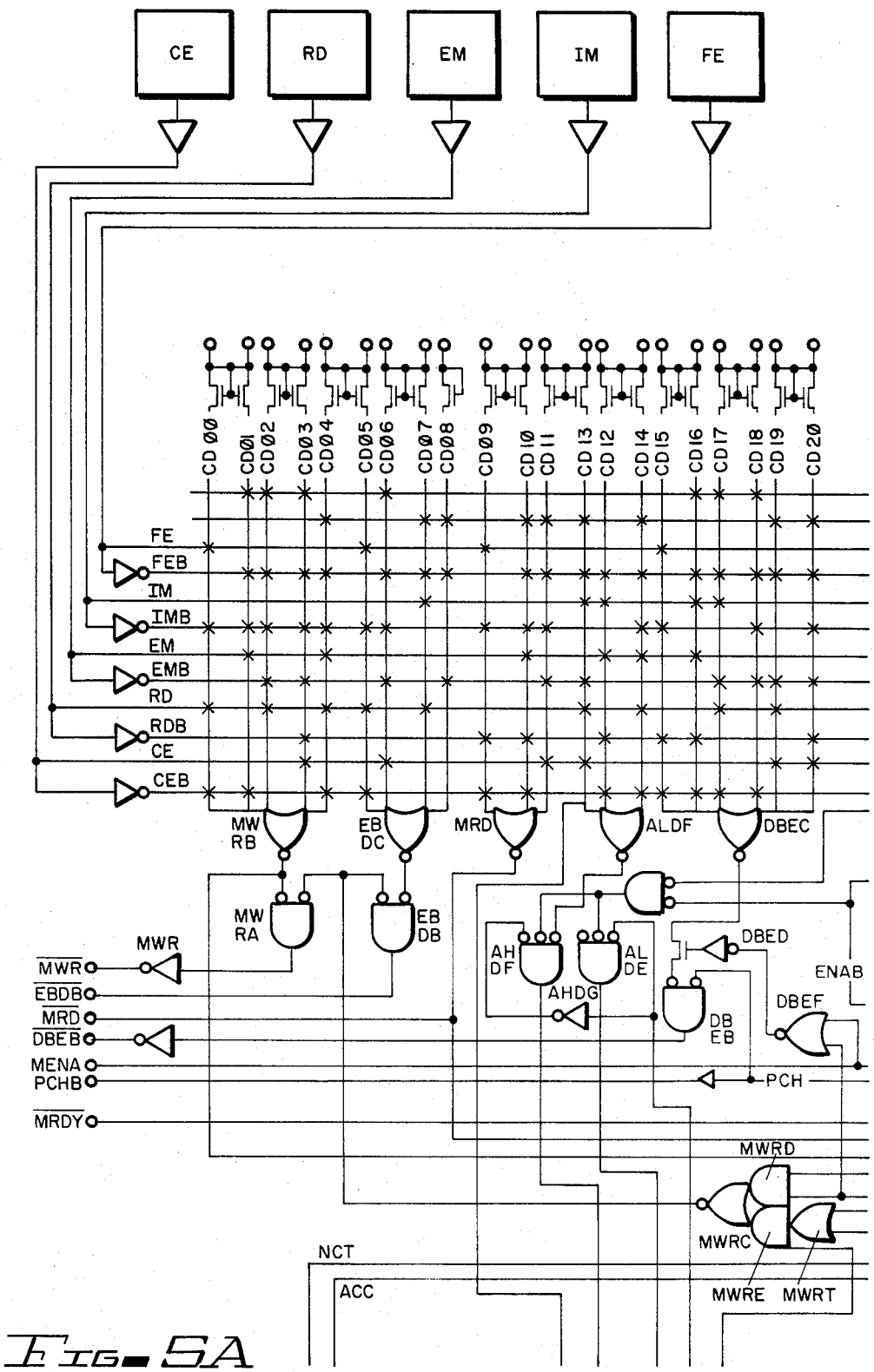
FIG. 5 shows the orientation of FIGS. 5A–5R, which together form a detailed logic diagram of the Function Decode Unit 70 of FIG. 1.
Figure 5B:
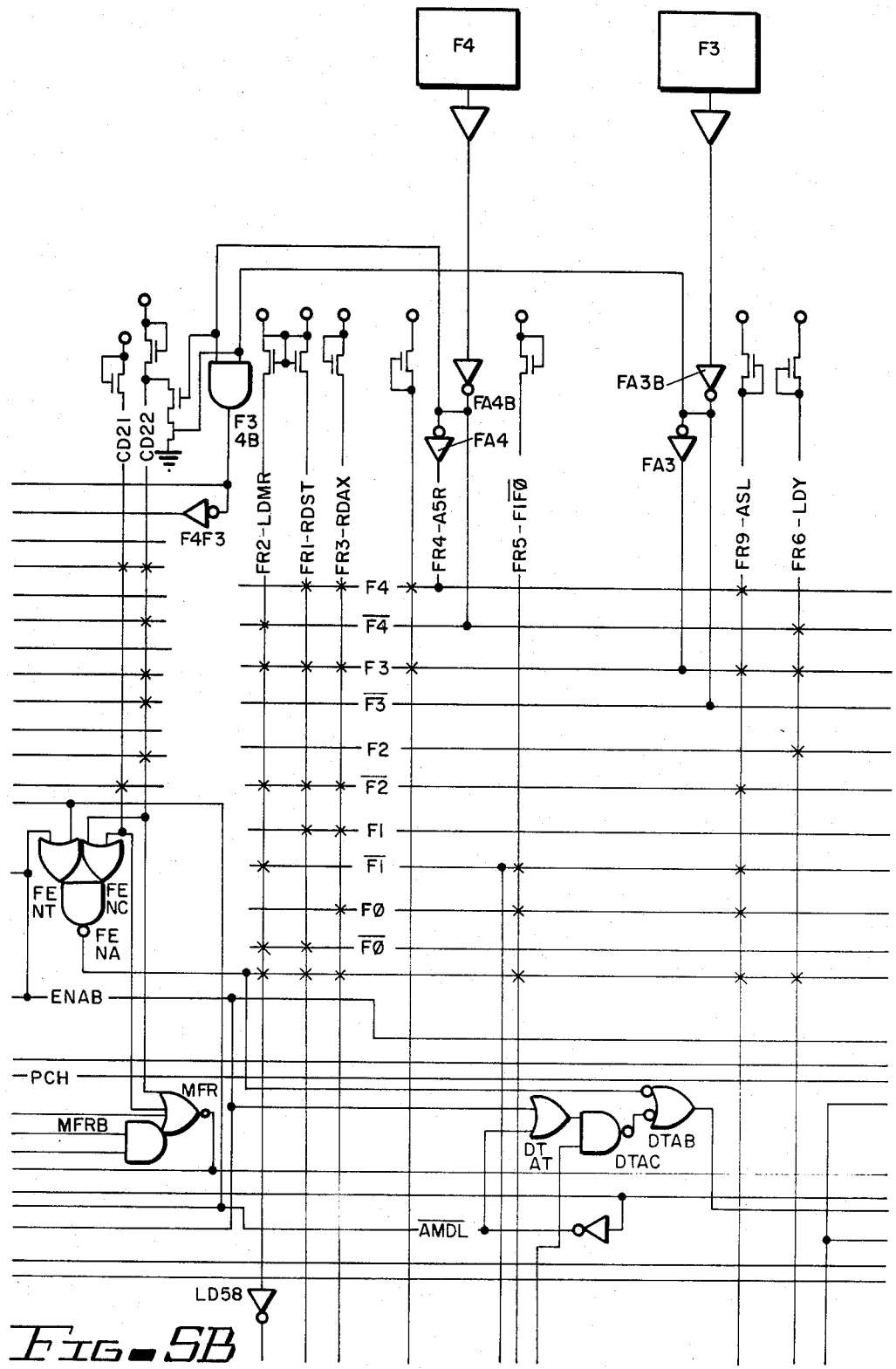
Figure 5C:
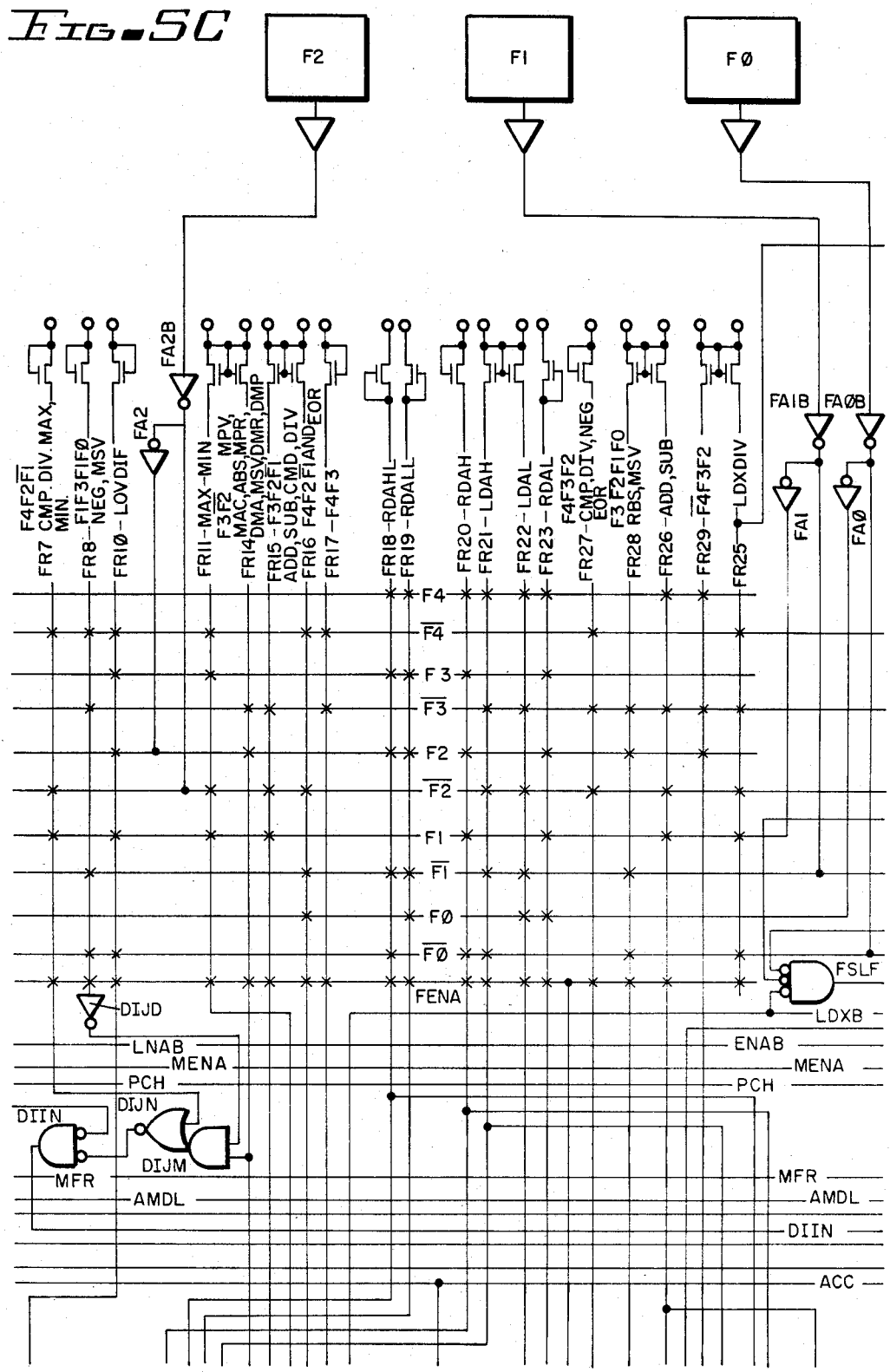
Figure 5D:
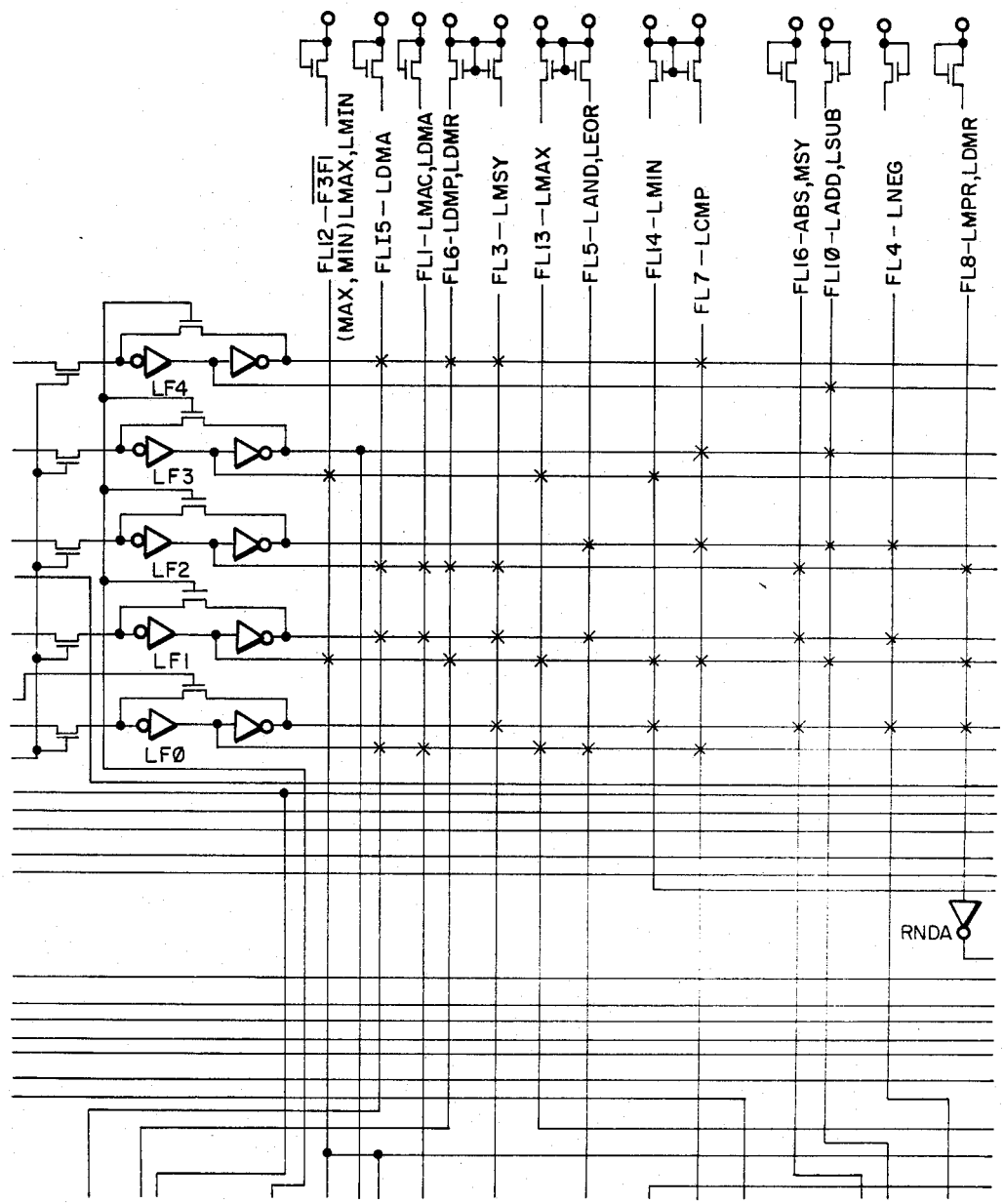
Figure 8E:
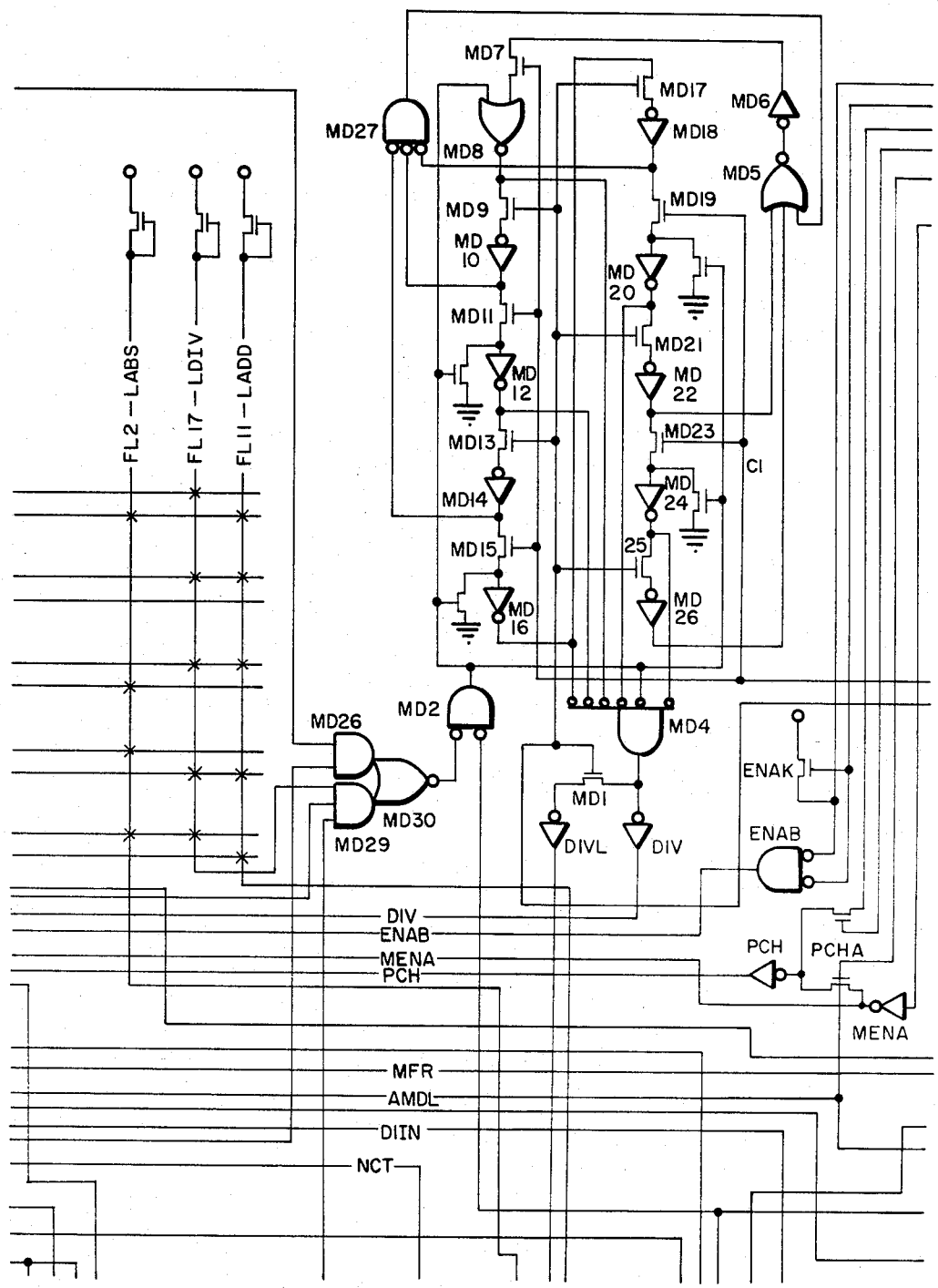
FIG. 8 shows a detailed logic diagram of the basic Accumulator High (AH) cell of which the AH portion of Accumulator 40 is constructed.
Figure 5F:
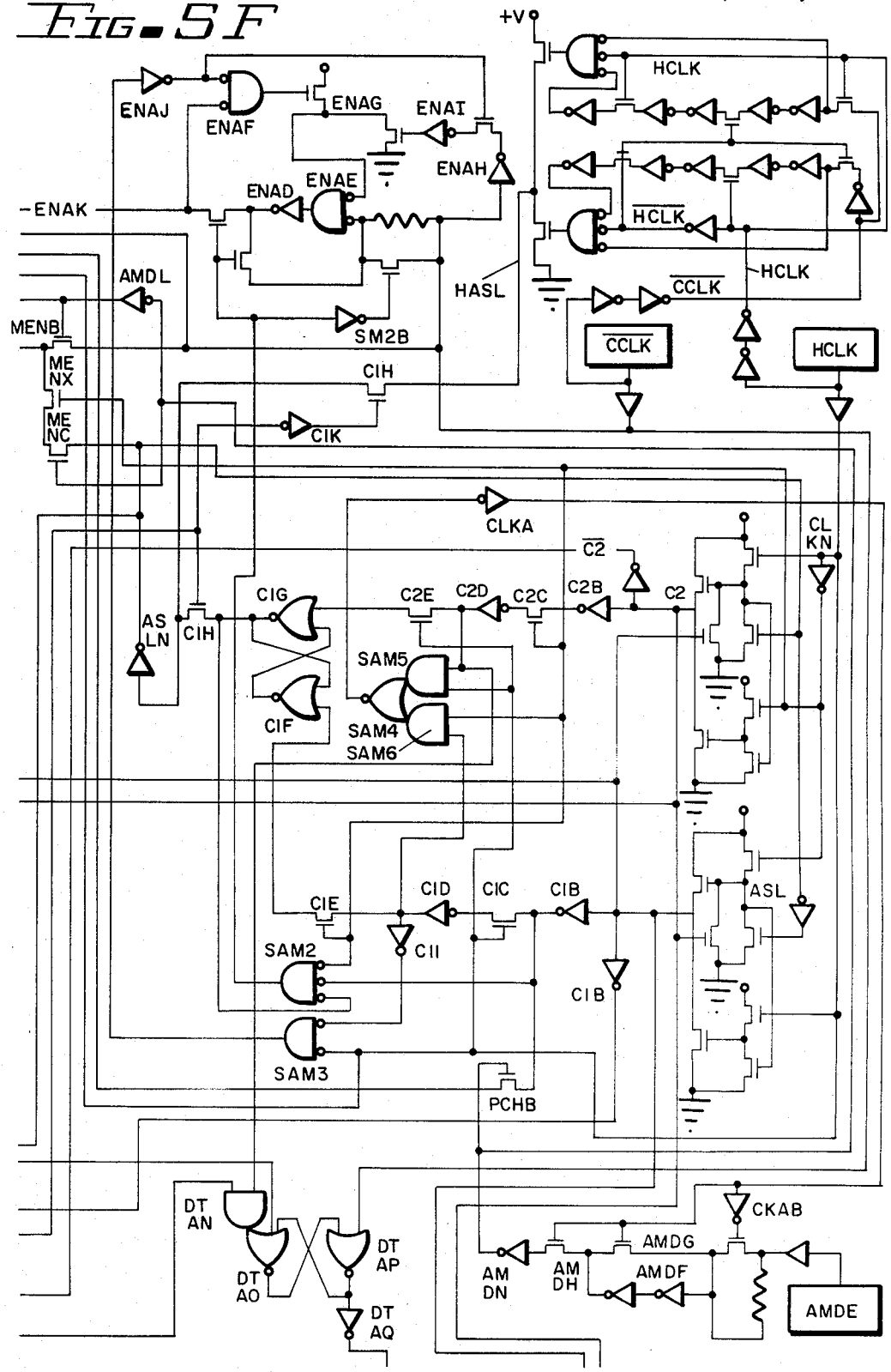
Figure 5H:
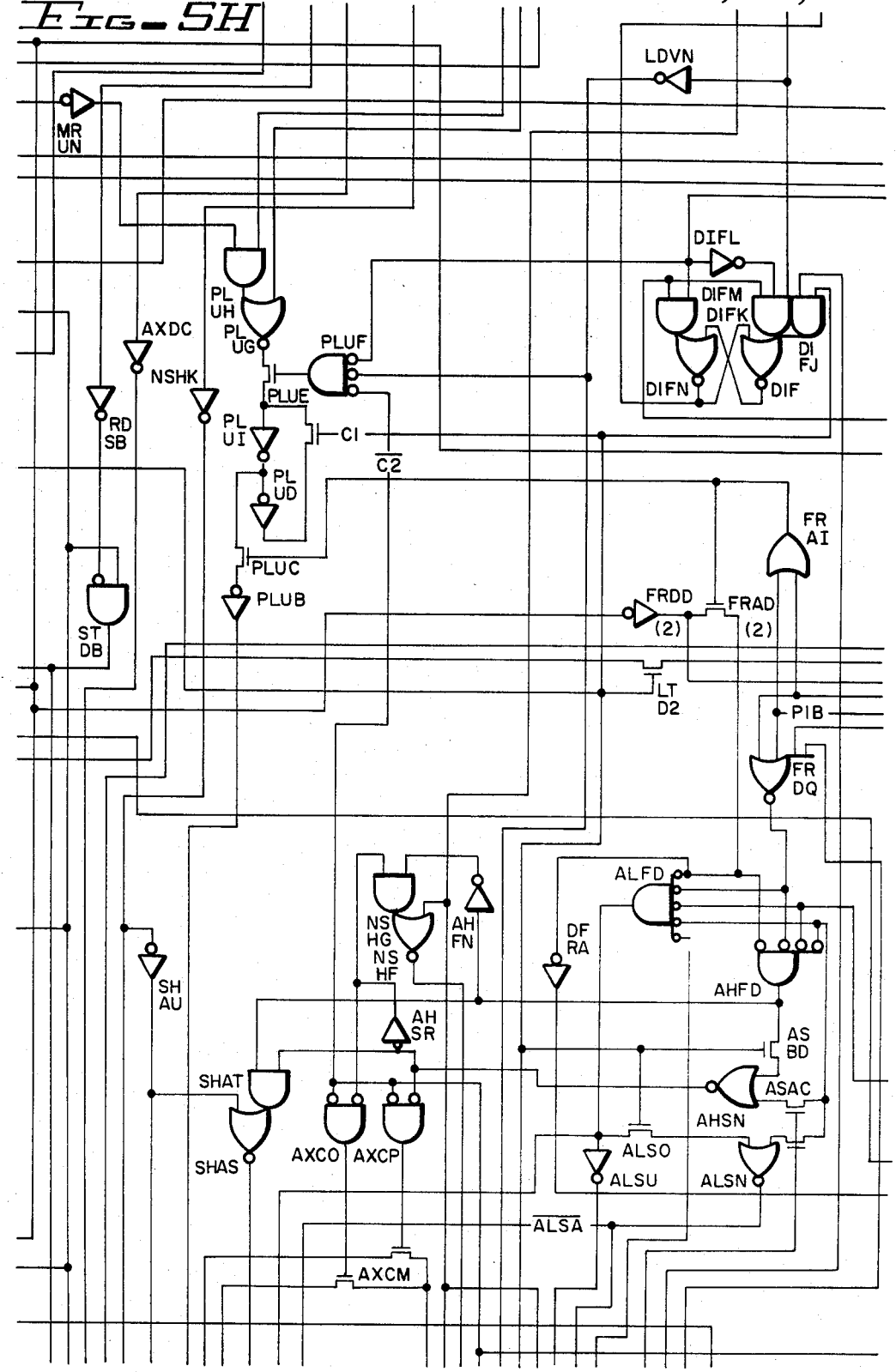
Figure 51:
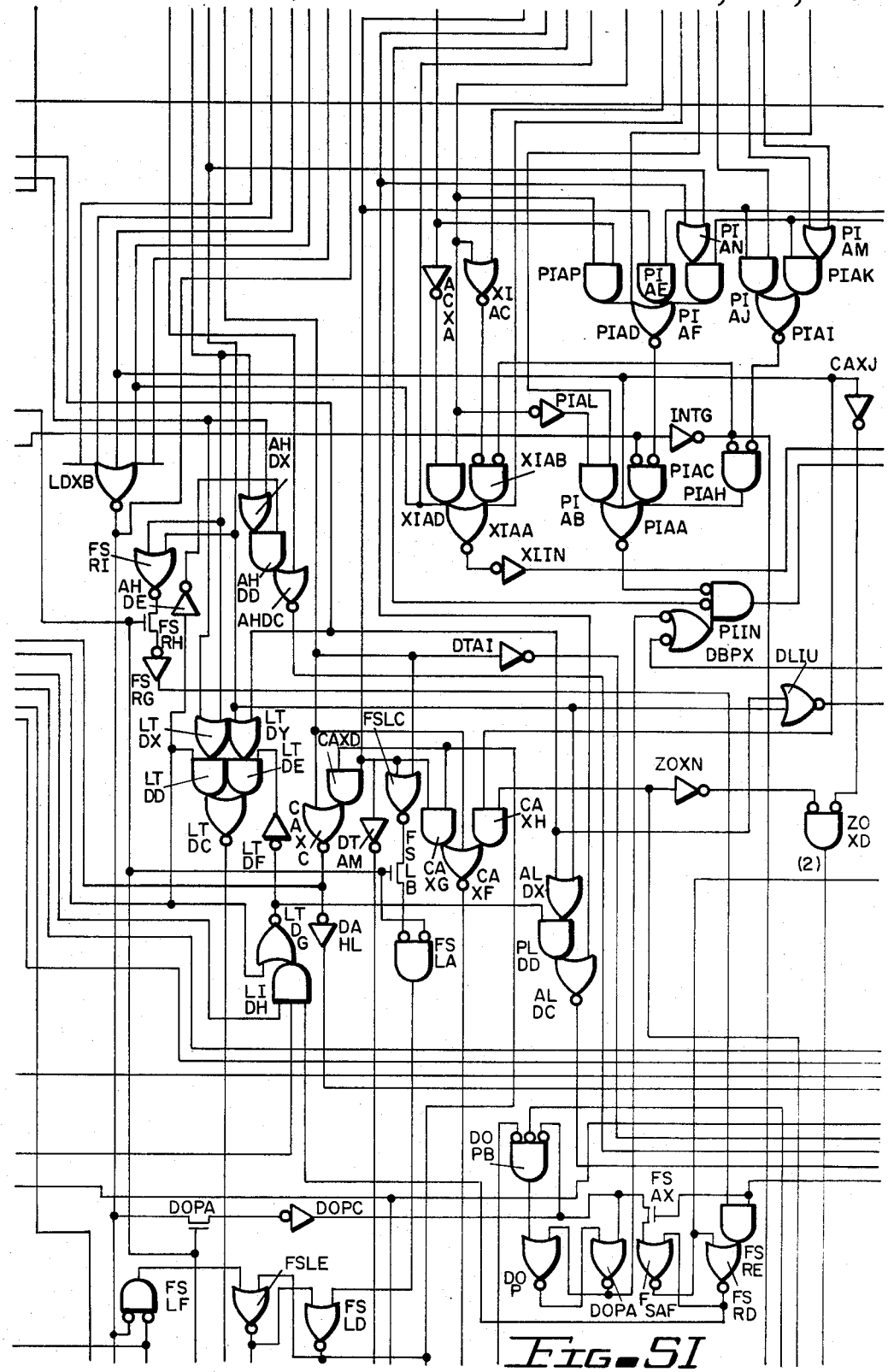
Figure 5J:
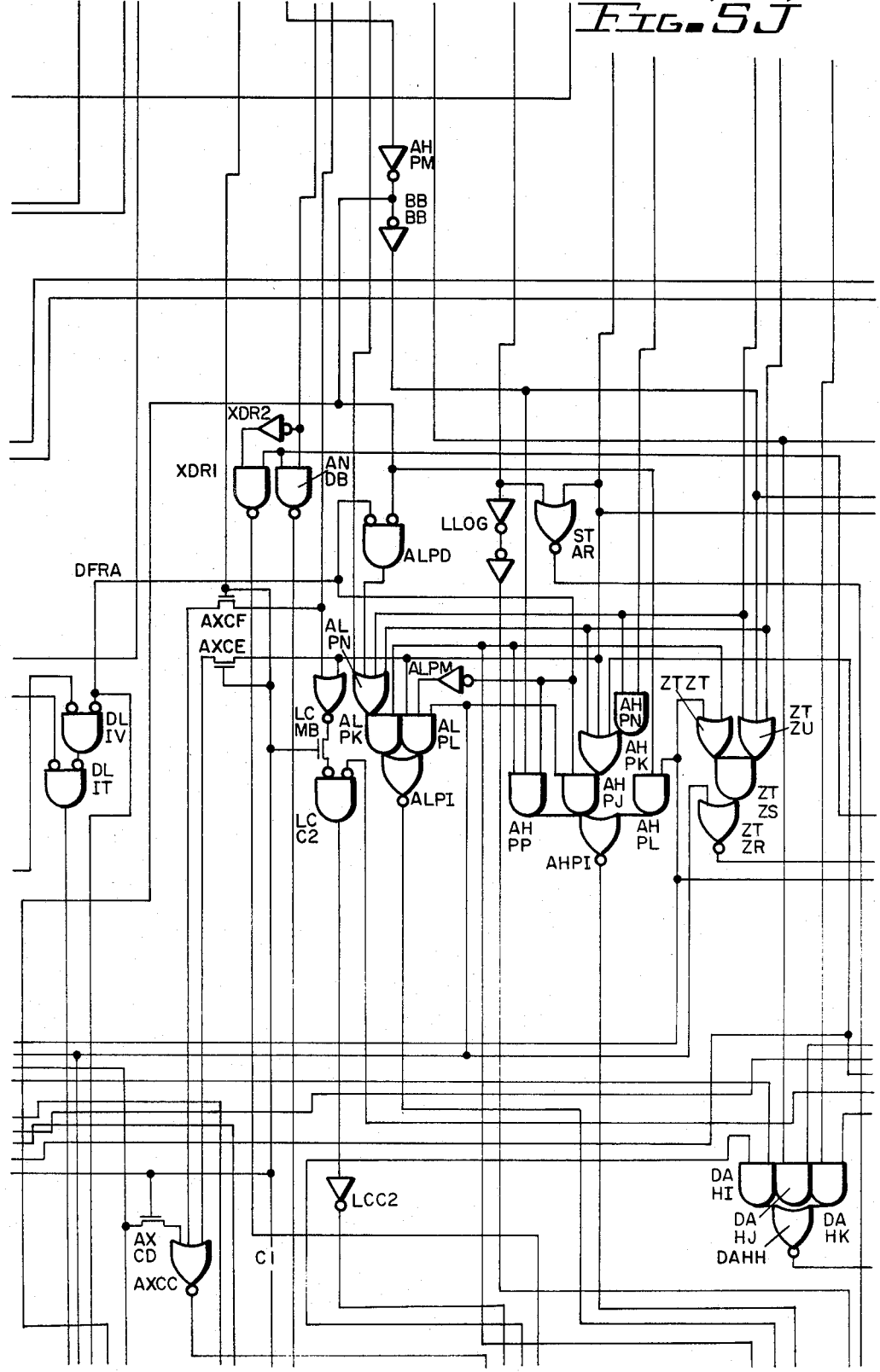
Figure 5K:
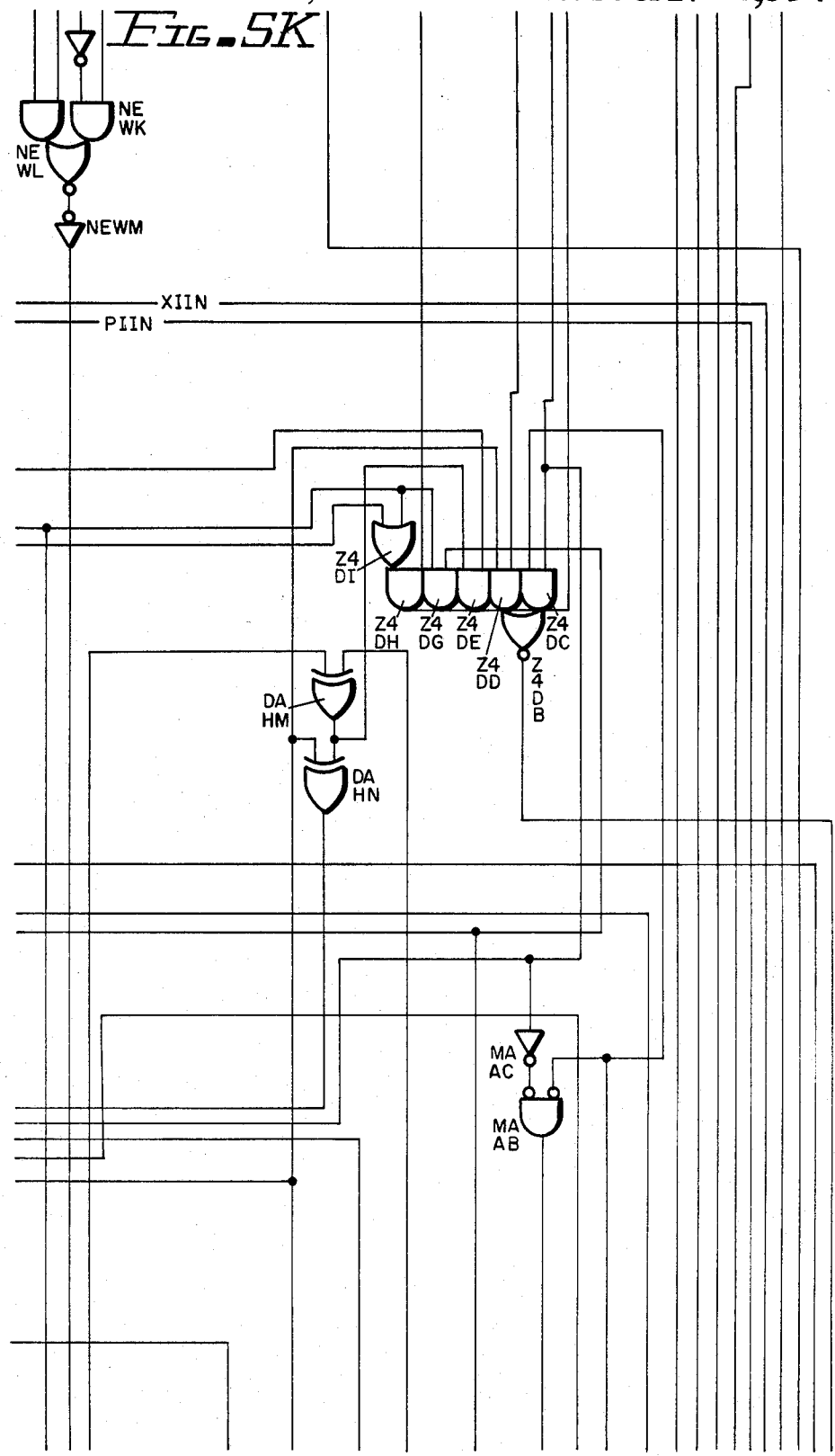
Figure 5L:
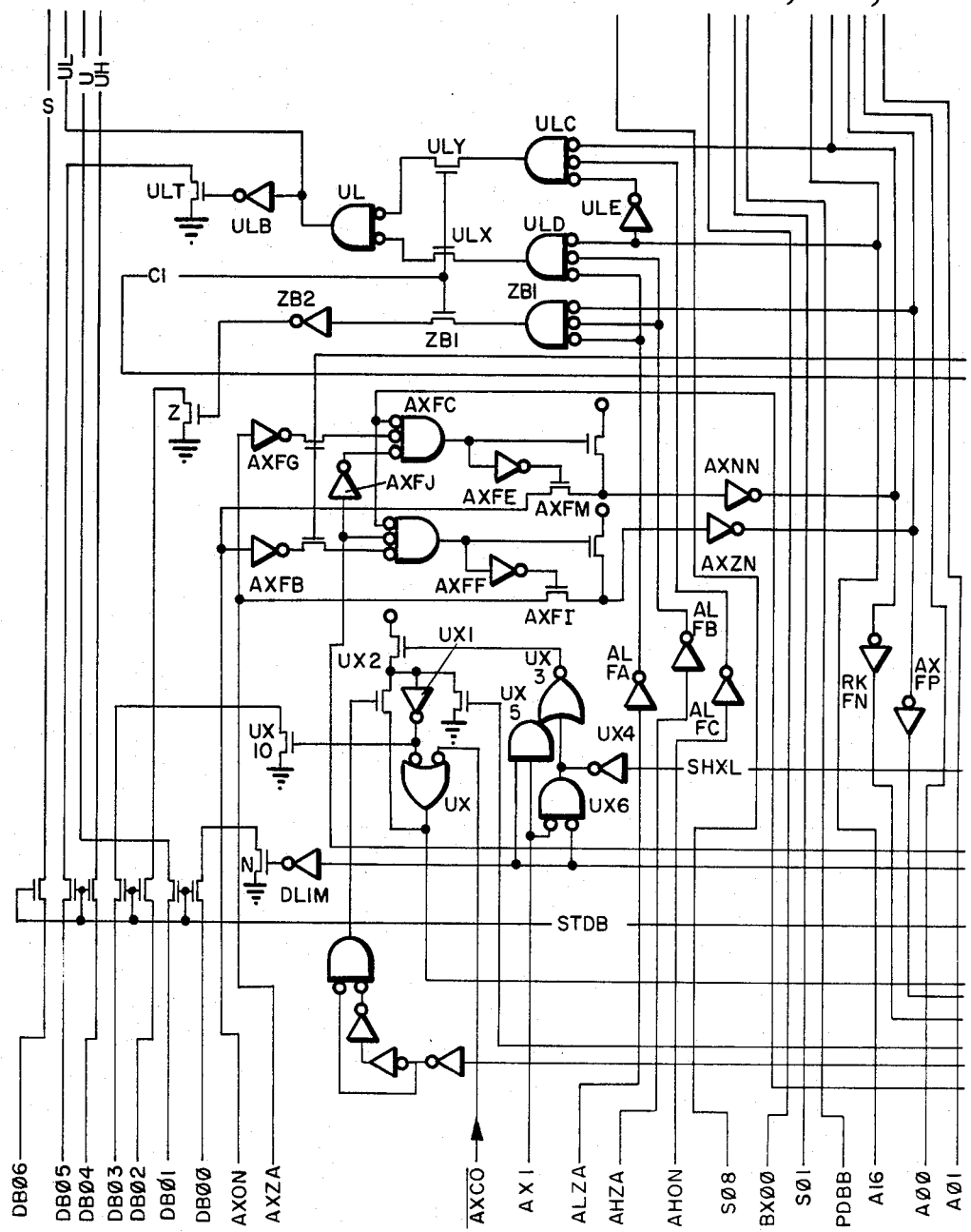
Figure 5N:
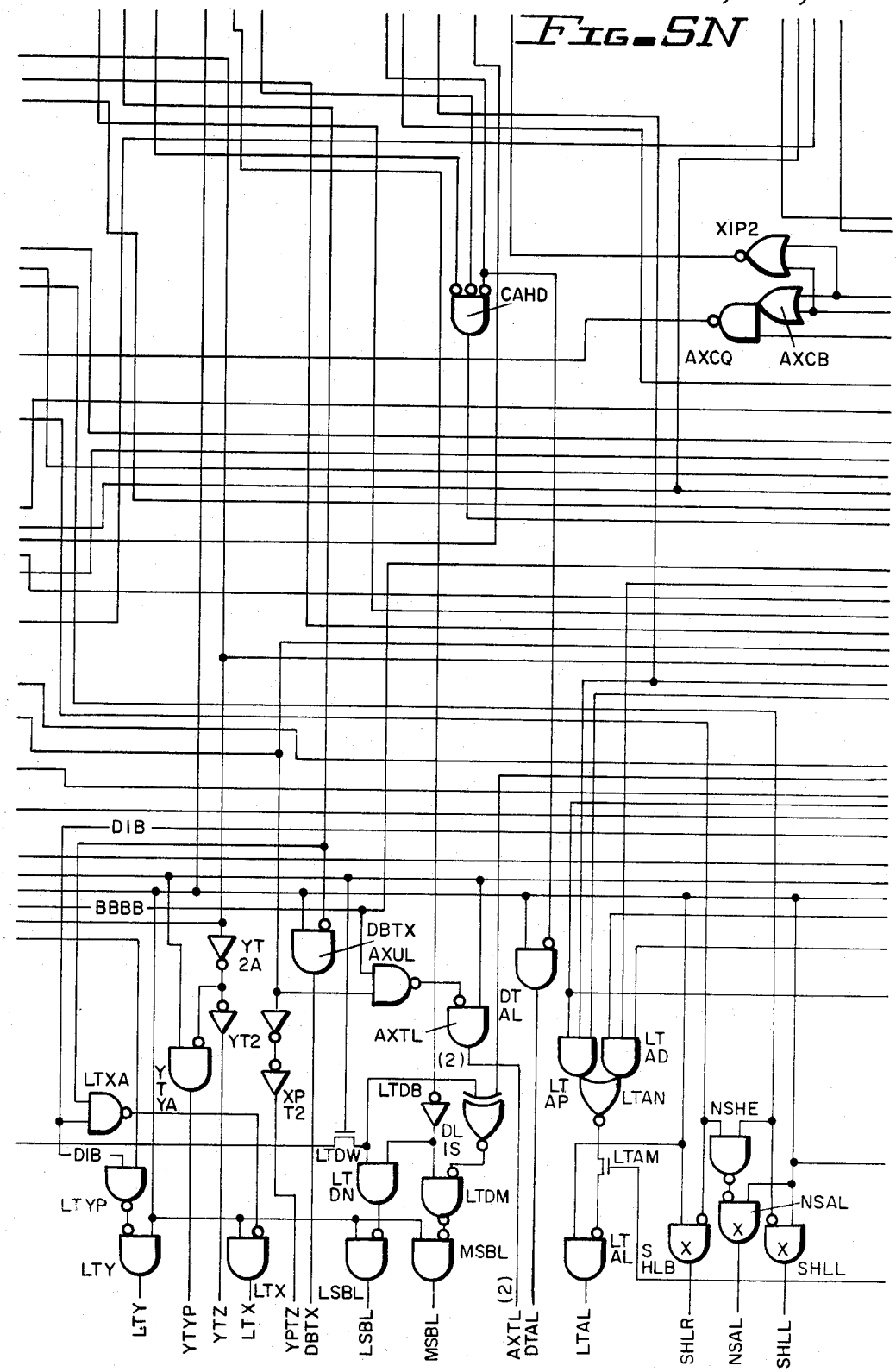
Figure 50:
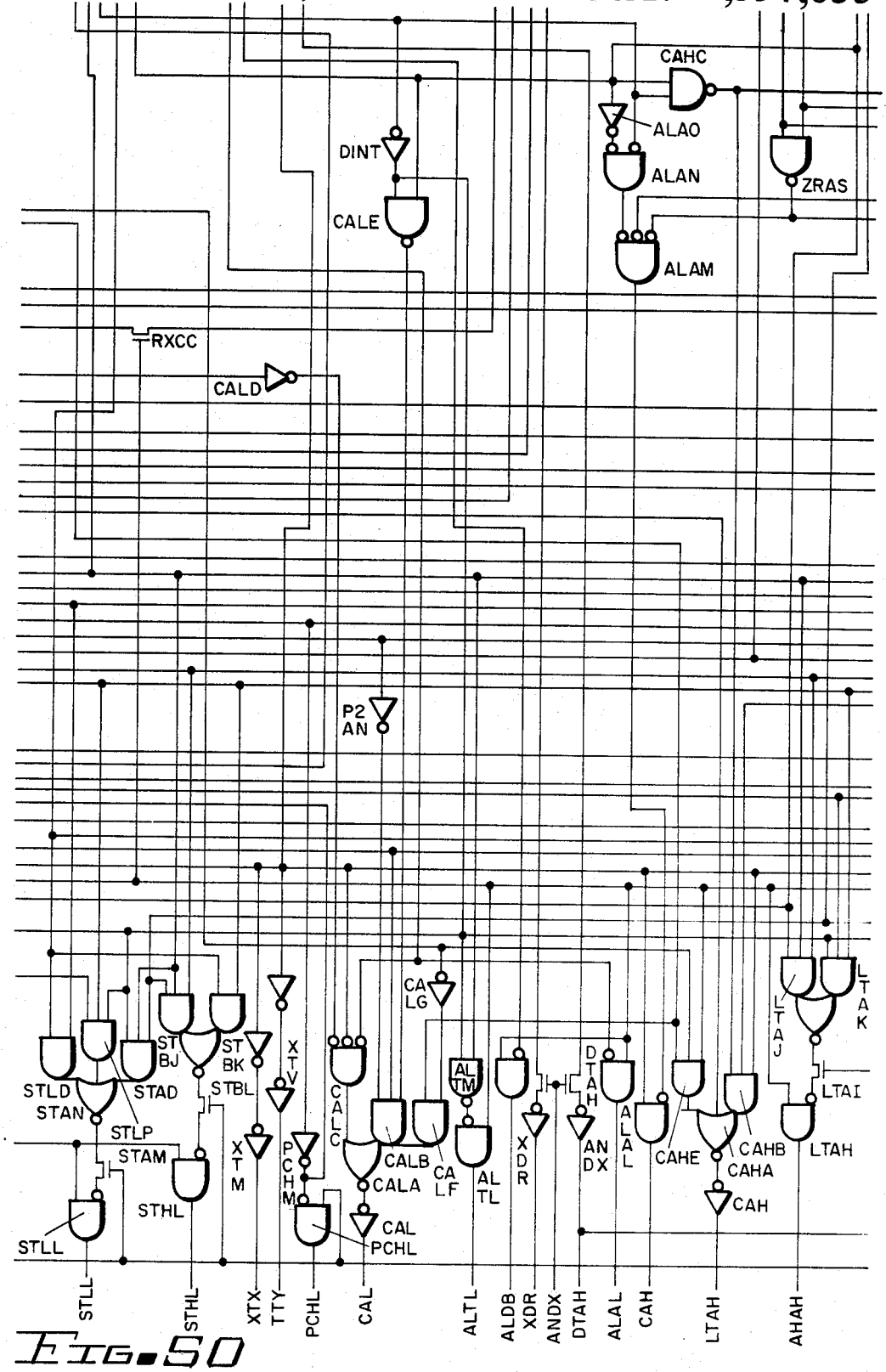
Figure 5Q:
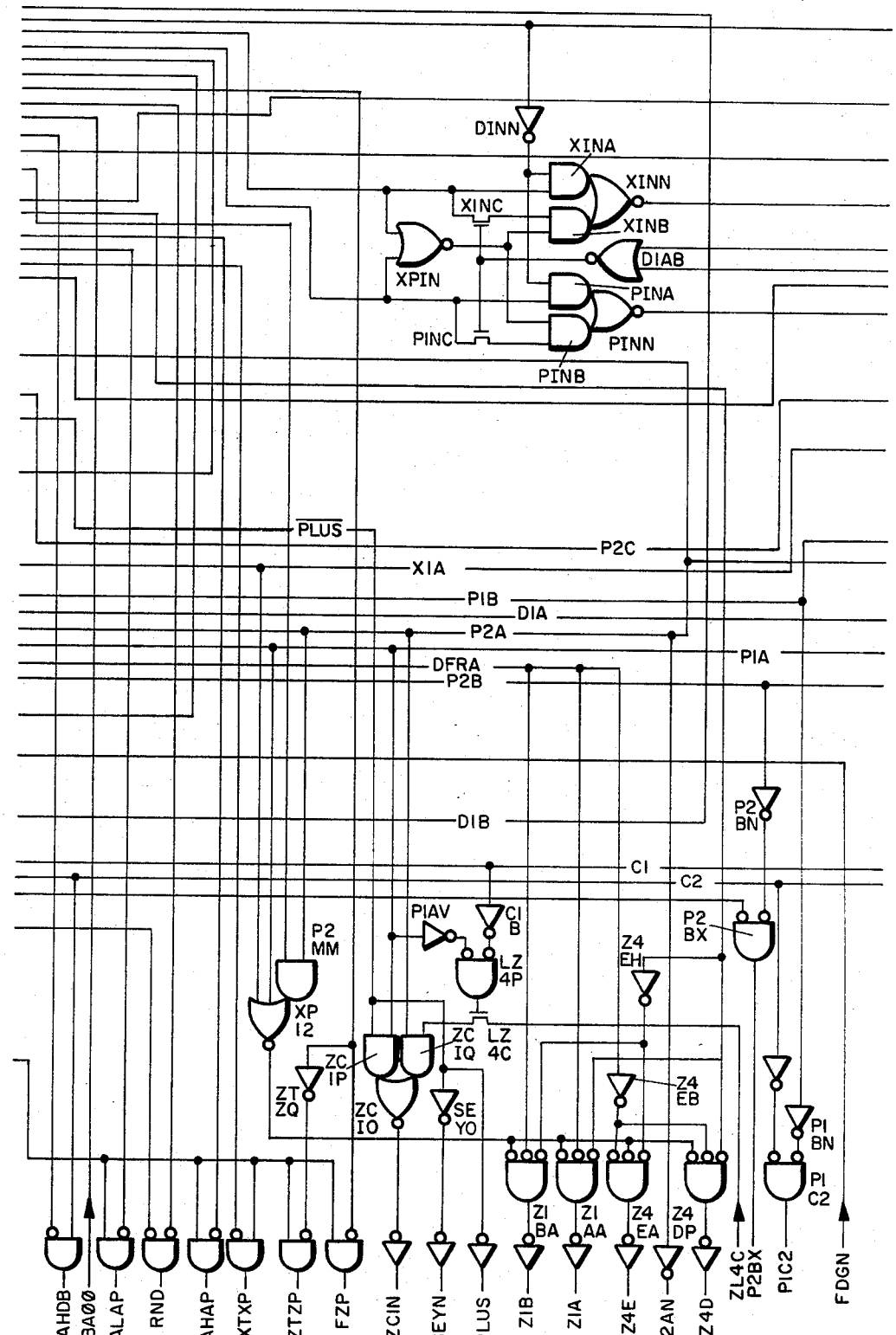
Figure 5R:
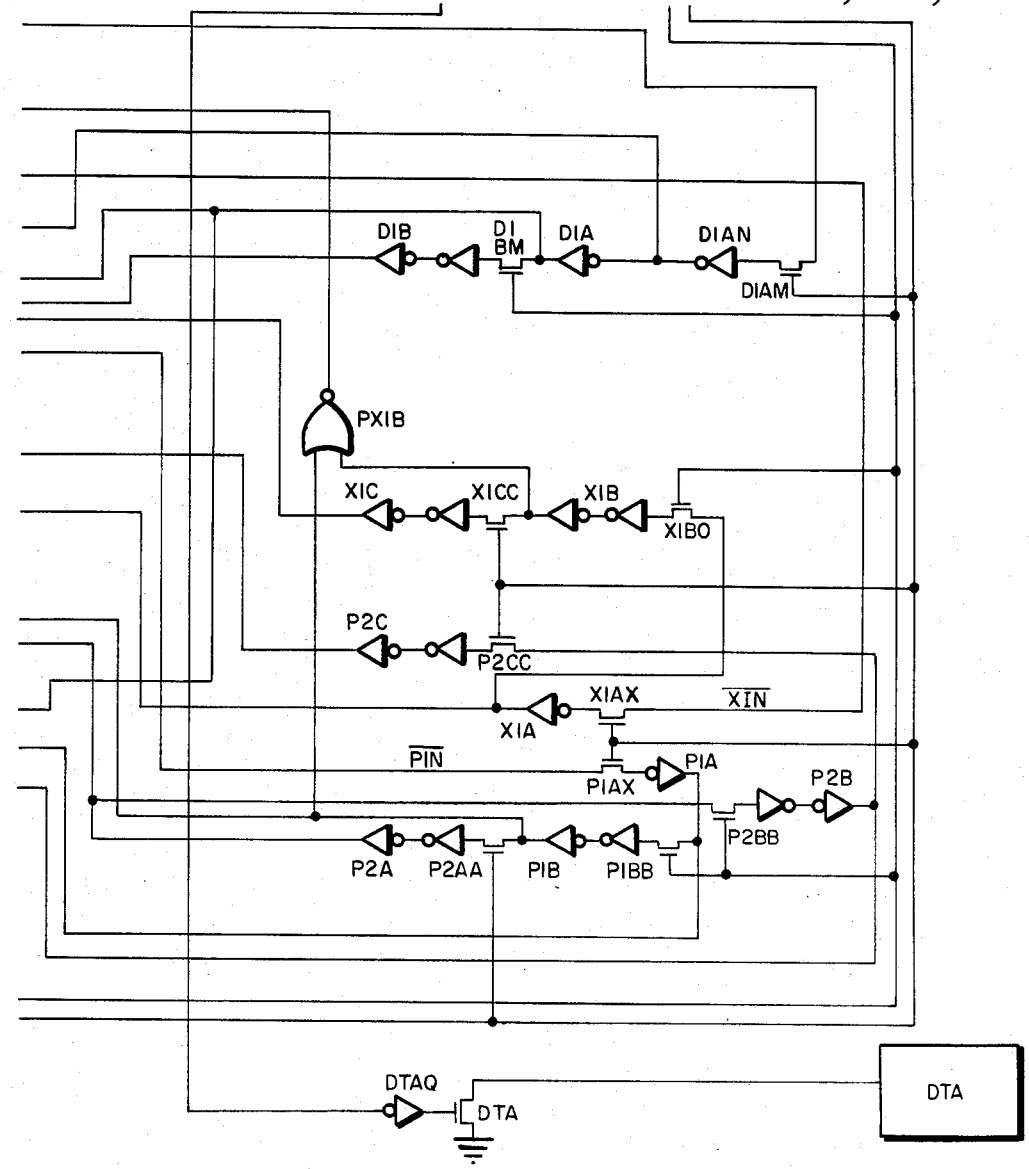

FIG. 2C shows the timing for the MAR in asynchronous mode.

In this mode, the MAR internal clocks are generated directly from HCLK (which must be supplied continuously) at the maximum rate—three HCLK cycles to one execution cycle—independent of CCLK. CCLK (active low) is used to initiate data transfers and functions but need not be supplied continuously. Operations, once initiated, will execute at the internal clock rate without further CCLK inputs.

CCLK may be applied (active low) at any time asynchronously to HCLK. Data transfers between the DB and RAM not involving MAR registers (FE=0) occur asynchronously; if a function is specified, its execution will be delayed if necessary until the start of the next internal clock cycle.

The DTA output is generated in response to CCLK to indicate that the data transfer and function are in progress, and that the inputs may be removed after the necessary hold time. DTA is an active low signal without an active pullup on the MAR, thus requiring an external passive pullup such as a resistor. It is intended to be connected in common with similar signals from other circuits in a "wire-or" configuration. DTA is generated only in response to the control and function input combinations specifically listed in Table 5.

Synchronous-Asynchronous Mode Switching

Usually the choice of synchronous or asynchronous mode will be dictated by the application and the AMODE pin will be permanently wired to a low or a high level. However, dynamic switching of the AMODE input is permissible with the following constraints:

Synchronous to asynchronous
  MODE may be switched high any time that CCLK is high (inactive).

Asynchronous to synchronous
  AMODE may be switched low any time that CCLK is high (inactive). CCLK should remain high for at least two full cycles of HCLK to insure that any internal cycle already in progress is complete before a new cycle is started.

Such mode switching might be used when debugging a synchronous system so that CCLK could be temporarily stopped for diagnostic purposes.

Programming Examples

The following examples illustrate the programming of the MAR for various tasks. Each line of the example corresponds to one cycle of operation (CCLK). The NO-OPs indicate the need to delay while the operation is executing before reading the final result. These cycles do not necessarily have to be true NO-OPs but could perform memory reads or writes or functions that do not involve the Accumulator or initiate operations, i.e., Load Y, Load Mode Register, Load X with delayed operation.

| Single Multiply: | | |
|---|---|---|
| LDYP | Y1 | |
| LDSMPY | X1 | |
| NOOP | | Multiply operation in progress |
| NOOP | | |
| RDAH | X1*Y1 (MS) | Result (Most-significant half) |
| RDAL | S1*Y1 (LS) | Result (least-significant half) |
| Logical AND (INTG mode): | | |
| LDAL | A1 | |
| LDXAND | X1 | |
| NOOP | | AND operation in progress |
| RDAL | A1 · X1 | Result |
| Multiply-Round and ADD (FRAC mode): | | |
| LDYM | Y1 | |
| LDXMPR | X1 | |
| NOOP | | Multiply operation in progress |
| LDXADD | X2 | |
| NOOP | | Add operation in progress |
| RDAH | | $-(X*Y)+Y2$ (Rounded to single word) |
| Square of Difference (INTG mode): | | |
| LDYDIF | Y1 | |
| LDXMPY | X1 | |
| NOOP | | Difference operation in progress |
| NOOP | | Multiply operation in progress |
| NOOP | | |
| RDAL | | $(Y\frac{1}{2} - X\frac{1}{2})^2$ (Least significant part) |
| Difference with third operand (FRAC mode): | | |
| LDYDIF | Y1 | |
| LDXDMP | X1 | |
| LDXMPY | X2 | Difference operation (Difference→ Y only) |
| NOOP | | Multiply operation in progress |
| NOOP | | |
| RDAH | | $(Y\frac{1}{2}X\frac{1}{2})*X2$ (most-significant part) |
| $(Y\frac{1}{2}$- Multiply-Accumulate: | | |
| LDYP | Y1 | |
| LDXMPY | X1 | |
| LDYP | Y2 | First multiply in progress |
| LDXMAC | | Second operand pair loaded |
| . | | Second multiply in progress |
| LDYP | Yn | |
| LDXMAC | Xn | |
| NOOP | | Last multiply in progress |
| NOOP | | |
| RDAL | | |
| RDAH | | Result = (X1*Y1) + (X2*Y2) + — + (Xn*Yn) |
| RDAX | | |
| Maximum Value (FRAC mode): | | |
| LDAH | X0 | |
| LDXMAX | X1 | |
| NOOP | | First maximum operation in progress |
| LDXMAX | X2 | |
| NOOP | | |
| LDXMAX | X3 | Second maximum operation in progress |
| . | | |
| LDXMAX | Xn | |
| NOOP | | Last maximum operation in progress |
| NOOP | | |
| RDAH | X (Max) | Result = maximum of (X0, X1, —,Xn) |
| RDAL | i | Index: X (MAX) = Xi |
| Array multiplication (delayed multiply) (FRAC mode): | | |
| LDYP | Y1 | |
| LDXMPR | X1 | |
| LDYP | Y2 | First multiply in progress |
| LDXDMR | X2 | Load second operand pair |
| RDAH① | X1*Y1 | Read first result |
| LDYP | Y3 | Second multiply in progress |
| LDXDMR | X3 | Load third operand pair |
| RDAH① | X2*Y2 | |
| . | | |
| LDYP | Yn | Multiply in progress |
| LDXDMR | Xm | Load last operand pair |
| RDAH① | Xn-1*Yn-1 | Read result |
| NOOP | | Last multiply in progress |
| NOOP | | |
| RDAH① | Xn*Yn | Read last result |

① If double-word result is desired, read AL first; RDAH starts delayed operation in FRAC mode.

Array multiply and Add ($Z'_i = X_i*Y_i + Z_i$)(INTG mode):

| LDYP | Y1 | Load first operand pair |
|---|---|---|
| LDXDMA | X1 | |
| LDAL① | Z1 | Load first update value |
| LDYP | Y2 | First multiply-accumulate operation in progress |
| LDXDMA | X2 | Load second operand pair |

-continued

| | | |
|---|---|---|
| RDAL | Z'1 | Read first result |
| LDAL① | Z2 | Load second update value |
| LDYP | Y3 | Secohd multiply-accumulate operation in progress |
| LDXDMA | X3 | |
| RDAL | Z'2 | Read second result |
| . | | |
| LDAL① | Zn | |
| NOOP | | Last multiply-accumulate operation in progress |
| NOOP | | |
| RDAL | Z'n | Read last result |

① If double-precision operation is desired, load AH first; LDAL starts DMA operation in INTG mode.

Multiply and scale result (INTG mode):

| | | |
|---|---|---|
| LDYP | Y1 | |
| LDXMPY | X1 | |
| NOOP | | Multiply operation in progress |
| NOOP | | |
| ASR | | Shift function |
| ASR | | Shift function |
| RDAL | | (X1*Y1)/4 Result |

Divide (Fractional data, FRAC Mode):

| | | |
|---|---|---|
| LDAH | A1 | (Most-significant) |
| LDAL | A1 | (Least-significant) |
| LDXSUB | X1 | |
| LDXDIV | X1 | Subtract operation in progress |
| NOOP | | |
| NOOP | | |
| NOOP | | |
| NOOP | | |
| NOOP | | |
| NOOP | | |
| NOOP | | Divide operation in progress (16 cycles) |
| NOOP | | |
| NOOP | | |
| NOOP | | |
| NOOP | | |
| NOOP | | |
| NOOP | | |
| RDAL | Quotient=(A1/X1) | |
| LDXADD | X1 | |
| NOOP | | Add operation in progress |
| RDAH | Remainder | |

Divide (Integer data, FRAC mode):

| | | |
|---|---|---|
| LDAH | A1 | (Most significant) |
| LDAL | A1 | (Least significant) |
| ASL | | Pre-shift divisor |
| LDXSUB | X1 | |
| LDXDIV | X1 | Subtract operation in progress |
| NOOP | | |
| NOOP | | |
| NOOP | | |
| NOOP | | |
| NOOP | | |
| NOOP | | Divide operation in progress (16 cycles) |
| NOOP | | |
| NOOP | | |
| NOOP | | |
| NOOP | | |
| NOOP | | |
| NOOP | | |
| RDAL | Quotient=(A1/X1) | |
| LDXADD | | |
| NOOP | | Add operation in progress |
| ASR | | |
| RDAH | Remainder | |

Operation of Preferred Embodiment

Operation of Two-Pass Digital Multiplier/Accumulator Circuit

The operation of the M/A 1 (FIG. 1) will now be described. As indicated earlier, the M/A 1 comprises two 16-bit operand registers (Registers X and Y, FIG. 1); an array of four 18-bit full adders (Adder 34, FIG. 1; see also Adders 101–104, FIG. 3), each adder having a data selector at its input; a decoder for the Y Register (Z Register 30, FIG. 1; see also decoders 111–114, FIG. 3) which controls the data selectors associated with the Adders; an Accumulator Register (Accumulator 40, FIG. 1); and Timing 80, Function 70, and Control 60 circuits for controlling the operation.

The M/A multiplies the contents of the two operand data registers, X and Y, and adds the result (product) to the Accumulator A. Optionally, the Accumulator may be cleared to zero at the start of the operation so that the product of X and Y is obtained without accumulating the previous contents of A.

The multiplication and addition to A are accomplished by passing the Accumulator contents twice through the array of Adders. The array comprises Adders 101–104 (FIG. 3) in cascade. Each Adder adds an appropriate multiple of the contents of the X Register to the accumulator or to the output of the previous Adder. The multiples are selected according to the contents of the Y Register. Eight bits (Y') of Y are selected during each pass thus producing a 24-bit result. During pass 1, the low-order 8 bits of Y are selected and the product is added to the low-order 24 bits of A. During pass 2, the high-order 8 bits of Y are selected and the product is added to the high order 24 bits of A.

The Adder array output is placed back into the corresponding portion of A when the additions are complete. (A buffer is provided to prevent a race condition). The new Accumulator content after pass 1 is:

$$A_{new} = A + Z_1 \cdot X + 4 \cdot Z_2 + X + 16 \cdot Z_3 + X + 64 \cdot Z_4 + X$$

After pass 2:

$$A_{new} = A + 2^8 \cdot (Z_1 \cdot X + 4 \cdot Z_2 \cdot X + 16 \cdot Z_3 X + 64 \cdot Z_4 \cdot X)$$

where: $Z_1 \cdot 4 \cdot Z_2 + 16 \cdot Z_3 + 64 \cdot Z_4 = Y'$ (the selected 8 bits of Y). The coefficients $Z_i$ may take the values: $-1, 0, +1, +2$, ($Z_4$ may also be $-2$ on pass 2 only)

These multiplex of X are all powers of two and thus require only a left shift and/or inversion of X or forcing of zeros as an input to each Adder.

All operands and results are considered as two's-complement signed numbers. Therefore on pass 2, Y' may be negative whereas on pass 1 it is always considered positive. The Z values are determined by adding the binary value 01010101 to Y' and decoding as per Table 6. The powers of 4 (4, 16, 64) are obtained by shifting the contents of X left two bits at the input of each successive adder stage as shown in Table 6.

Since left-shifting of X produces zeros in the low-order bit positions, Adder stages are not required in the low-order positions for the higher multiples of X, and they are not implemented. The high-order bits of the Adders (beyond 16 bits) are required only to handle the extended Sign of the selected multiple of X, and a possible ripple Carry. Two additional bits (for a total of 18 bits per Adder) can take care of this Sign and Carry with a circuit which provides inputs to the two high-order Adder positions.

This circuit operates as follows:

The sign of X ($X_s$) and Carry out of each Adder (C) produce an effective Carry (C') of 0, +1, or −1. This effective Carry can be encoded as a 2-bit value denoted (G, F) as follows:

| $X_s$C | | C' | G | F |
|---|---|---|---|---|
| 0 | 0 | 0 | 0 | 0 |
| 0 | 1 | +1 | 0 | 1 |
| 1 | 0 | −1 | 1 | 1 |
| 1 | 1 | 0 | 0 | 0 |

These two bits are added to the accumulating value in the next Adder level. If the effective Carry (C') is negative (G=1), an additional −1 must be passed to the next Adder level. Thus its effective Carry may be 0, +1, −1, or −2 as follows ($G^{-1}$ is the value of G from the previous Adder level):

| $G^{-1}X_s$C | | | C' | G | F | | $G^{-1}X_s$C | | | G | F |
|---|---|---|---|---|---|---|---|---|---|---|---|
| 0 | 0 | 0 | 0 | 0 | 0 | | 0 | 0 | 1 | 0 | 1 |
| 0 | 0 | 1 | +1 | 0 | 1 | | 0 | 0 | 0 | 0 | 0 |
| 0 | 1 | 0 | −1 | 1 | 1 | | 0 | 1 | 1 | 1 | 0 |
| 0 | 1 | 1 | 0 | 0 | 0 | or | 0 | 1 | 0 | 0 | 1 |
| 1 | 0 | 0 | −1 | 1 | 1 | | 1 | 0 | 1 | 1 | 0 |
| 1 | 0 | 1 | 0 | 0 | 0 | | 1 | 0 | 0 | 0 | 1 |
| 1 | 1 | 0 | −2 | 1 | 0 | | 1 | 1 | 1 | 1 | 1 |
| 1 | 1 | 1 | −1 | 1 | 1 | | 1 | 1 | 0 | 1 | 0 |

The table on the right is the same as that on the left with C and F inverted. It shows that the two required signals can be obtained from a simple Adder with $G^{-1}$, $X_s$, and NOT C as inputs. F is the sum, and G is the Carry out. The resulting Adder configuration is shown in FIG. 4.

The use of a 2-bit-at-a-time algorithm in a parallel multiplier eliminates one-half of the required Adders at the expense of providing a like number of data selectors. In an NMOS circuit, data selectors are made of multiple transmission gates, occupy minimal space, and consume no DC power (except for drivers). The resulting array is therefore considerably smaller and consumes less power than if a conventional parallel array were used.

The number of Adders and data selectors is halved again by making two passes through the array to complete the multiply. This two-cycle multiple matches very well with the two cycles required to load two operands via the single 16-bit Data Bus 15. As explained below, buffers are provided for the X and Y Registers so that new operands may be loaded while the previously-initiated multiplication is in progress. The penalty for two-cycle multiplication is additional timing logic required, which is much less than the logic saved by halving the Adder array. Three Carry bits must also be saved between passes, but again the required logic is minimal.

Operation of Pipelined Multiplier

The pipelining operation of the M/A will now be described. As discussed herein, the M/A can load or read a single 16-bit operand during a single cycle. It can also form the product of two such operands and add it to the 32-bit Accumulator Register (A) during 2 cycles.

The two operand buffer Registers X and Y permit two new operands to be loaded during the 2 cycles in which a multiply operation is taking place on the two operands which were loaded previously. A Function input specifies the register that data is to be loaded or read from during each cycle, and it also specifies, in the case of data to be loaded, the operation to be performed on that data during subsequent cycles. The Control and Timing circuitry implement the loaading, reading, and multiplying.

The Function input can specify, among other things:
- Load AH (high-order half)
- Load AL (low-order half)
- Read AH
- Read AL
- Load Y
- Load X-Multiply
- Load X-Multiply-Accumulate The Load X-Multiply and Load X-Multiply-Accumulate functions cause the product of X and Y to be formed and added to the Accumulator. However, Load X-Multiply first causes the Accumulator to be cleared to zero.

These functions permit a pipelined multiply-accumulate as follows for the function: Sum ($r_i \cdot s_i$) i=1 to n:

| Function | Data | Operation in Progress |
|---|---|---|
| LOAD Y | $r_1$ | None |
| LOAD X-MULTIPLY | $s_1$ | |
| LOAD Y | $r_2$ | $r_1 \cdot s_1$ |
| LOAD X-MULT-ACC | $s_2$ | |
| LOAD Y | $r_3$ | $A + r_2 \cdot s_2$ |
| LOAD X-MULT-ACC | $s_3$ | |
| . | . | |
| . | . | |
| . | . | |
| LOAD Y | $r_n$ | $A + r_{n-1} \cdot s_{n-1}$ |
| LOAD X-MULT-ACC | $s_n$ | |
| WAIT | — | $A + r_n \cdot s_n$ |
| WAIT | — | |
| READ AH | | (r · s) |
| READ AL | | |

The total number of cycles is 2n+4.

For a sequence of non-accumulating multiples of the form:

$$t_i = r_i \cdot x_i \quad i = 1, 2, \ldots, n$$

using only the functions described, six cycles are required per multiply, two of which are wait cycles. In a typical application, only 16-bits of precision are required in the result, so only one READ A needs to be performed, and 5 cycles are sufficient per multiply, two of which are WAITs.

To improve the efficiency of this type of calculation, another function is added: LOAD X-DELAYED MULTIPLY. This function loads data into the X Register and establishes the operation to be performed, but it does not initiate the multiply operation. The multiply operation is automatically initiated following a subsequent READ A. This function permits two operands to be loaded while a previous multiplication is in progress, but permits the previous result to be read before the new operation is performed as shown below.

| Function | Data | Operation in Progress |
|---|---|---|
| LOAD Y | $r_1$ | none |
| LOAD X-MULTIPLY | $s_1$ | |
| LOAD Y | $r_2$ | $r_1 \cdot s_1$ |
| LOAD X-DEL.MULT. | $s_2$ | |
| READ A | $t_1$ | |

-continued

| Function | Data | Operation in Progress |
|---|---|---|
| LOAD Y | $r_3$ | $r_2 \cdot s_2$ |
| LOAD X-DEL.MULT. | $s_3$ | |
| READ A | $t_2$ | |
| . | | |
| . | | |
| . | | |
| LOAD Y | $r_n$ | $r_{n-1} \cdot s_{n-1}$ |
| LOAD X-DEL. MULT. | $s_n$ | |
| READ A | $t_{n-1}$ | |
| WAIT | — | $r_n \cdot s_n$ |
| WAIT | — | |
| READ A | $t_n$ | |

The total number of cycles is $3n+2$ whereas $5n$ cycles would be required without the DELAYED-MULTIPLY function.

Another delayed function is provided for calculations of the form:

$$t_i = q_i + r_i s_i \quad i = 1, 2, \ldots, n$$

This function is LOADX-DELAYED MULTIPLY-ACCUMULATE. In this case, the operation is initiated by a LOAD A function rather than a READ A.

Assuming 16-bit precision for qi and ti, the sequence is as follows:

| Function | Data | Operation in Progress |
|---|---|---|
| LOAD Y | $r_1$ | None |
| LOADX-DEL.MULT-ACC | $s_1$ | |
| LOAD A | $q_1$ | |
| LOAD Y | $r_2$ | $q_1 + r_1 \cdot s_1$ |
| LOADX-DEL. MULT-ACC | $s_2$ | |
| READ A | $t_1$ | |
| LOAD A | $q_2$ | |
| LOAD Y | $r_3$ | $q_2 + r_2 \cdot s_2$ |
| LOAD X-DEL.MULT-ACC | $s_3$ | |
| READ A | $t_2$ | |
| . | | |
| . | | |
| . | | |
| LOAD Y | $r_n$ | $q_{n-1} + r_{n-1} \cdot s_{n-1}$ |
| LOAD X-DEL.MULT-ACC | $s_n$ | |
| READ A | $t_{n-1}$ | |
| LOAD A | $q_n$ | |
| WAIT | — | $q_n + r_n \cdot s_n$ |
| WAIT | — | |
| READ A | $t_n$ | |

The total number of cycles is $4n+2$ versus $6n$ without the DELAYED MULTIPLY-ACCUMULATE function.

Operation of Arithmetic Unit Having Maximum/Minimum Operations

The operation of the M/A as an Arithmetic Unit performing Maximum and Minimum operations will now be described.

Such Arithmetic Unit comprises the X Register 10; the A Register 40, which is subdivided into two 16-bit halves AH (high), AL (low), and counter AX; and Control circuitry which performs the operations LOADX MAX (maximum), LOADX MIN (minimum), LOAD AH, LOAD AL, READ AH, and READ AL.

A FRACTION/INTEGER mode bit controls the use of AH and AL internally. The following description holds for INTEGER mode; for FRACTION mode, AH and AL are interchanged everywhere except for the LOAD/READ AH/AL functions.

LOAD AH/AL places data from the Data Bus 15 into AH/AL and clears AX and AL/AH to zero (independent of mode).

READ AH/AL places data from AH/AL onto Data Bus 15 (independent of mode).

LOADX MAX/MIN places data from Data Bus 15 into X and then performs the following operations:

(1) The difference (AH−X) is formed and the counter AX is incremented by one.

(2) If $(AH-X) \geq 0$ (MAX) or $(AH-X) < 0$ (MIN), then the value in X is transferred into AH and the value in AX is transferred into AL. Otherwise AH and AL are unchanged.

The result of the sequence:

| | |
|---|---|
| LOAD AH | data 0 |
| LOADX MAX | data 1 |
| . | |
| . | |
| . | |
| LOADX MAX | data n | is as follows:

AH contains the maximum of values: data 0, data 1, . . ., data n. AL contains the index number (0 to n) indicating which of the values was the maximum.

If LOADXMIN replaces LOADXMAX in the above sequence, AH will contain the minimum value.

If two or more of the data values are equal and maximum or minimum, then the last maximum value entered will be reflected in the index following LOADX MAX, and the first minimum value will be reflected following LOADX MIN. This is the result of the asymmetry in the comparison.

Thus, a single computer instruction per data value will give the maximum or minimum value in a sequence of such values as well as an indication of which value was the maximum or minimum.

The known prior art would require separate instructions to:

| | | |
|---|---|---|
| (1) | Increment the count. | |
| (2) | Compare data values. | |
| (3) | Perform conditional branch on the result of the compare. | |
| (4) | Save the new value. | } if a new maximum or minimum occurs |
| (5) | Save the index. | | for each data value.

The various data signals (e.g., X, $\overline{X}$, 2X, carry, Cin, Cout, etc. appearing in the logic diagrams for the individual cell building blocks depicted in FIGS. 6-15 are input either via the Internal Data Bus 15 or are generated by one of the other individual cells.

Figure 6:
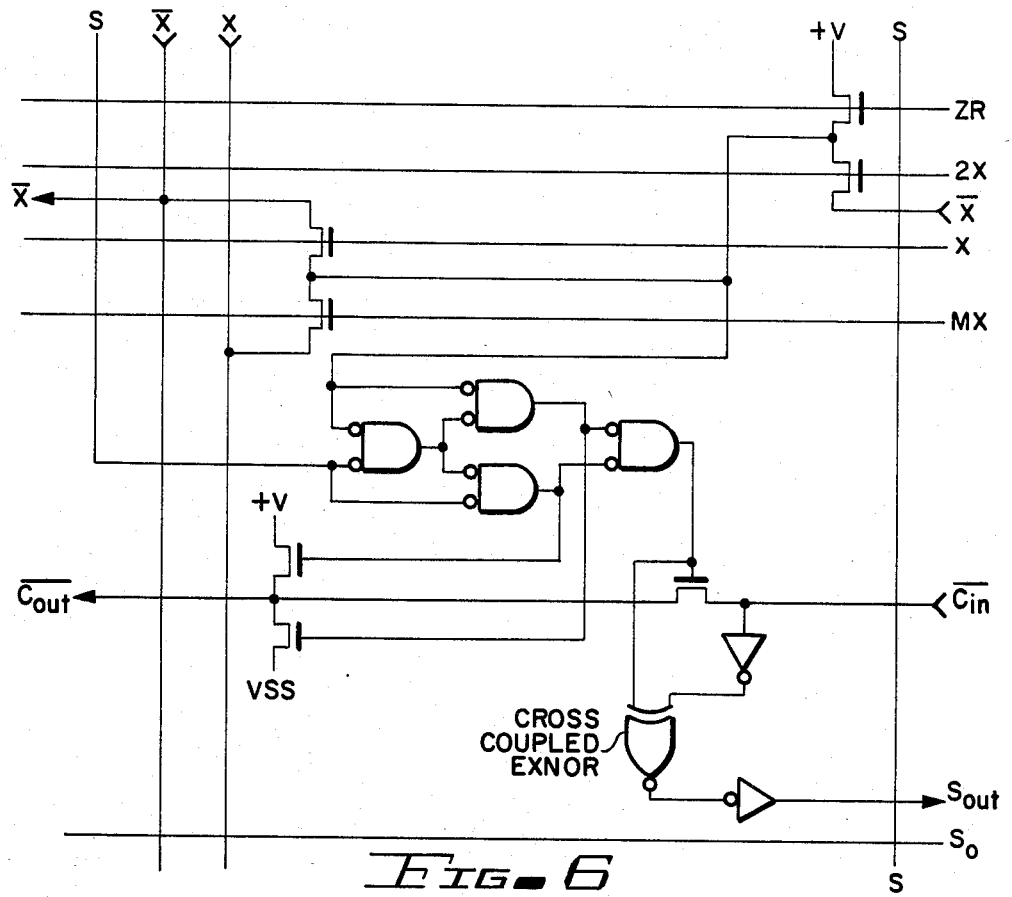
FIG. 6 shows a detailed logic diagram of the basic Adder cell of which Adder 34 is constructed.
Figure 11:
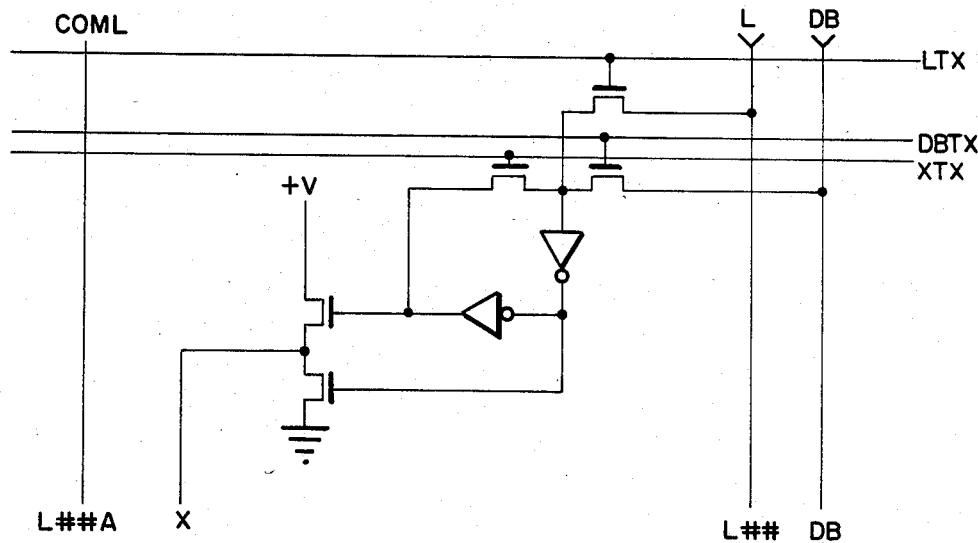
FIG. 11 shows a detailed logic diagram of the basic X Register cell of which X Register 10 is constructed.

For example, in FIG. 6, which shows one of the basic Adder cells, the ZR, 2X, X, and MX signals are intermediate data signals which have been generated by the appropriate one of the Z decoders. For example, if the Adder cell is in the top level of the Adder (i.e. Adder 101, FIG. 3), then the ZR, 2X, X, and MX signals are actually (by reference to FIG. 13 which depicts the top level Z decoder 111 in FIG. 3) the Z1ZR, Z12X, Z1X, and Z1MX outputs of the top level Z decoder.

The various control signals shown in the logic diagrams for the individual cell building blocks depicted in FIGS. 6-15 are generated by the Function Decode Logic shown in FIG. 5.

Figure 7:
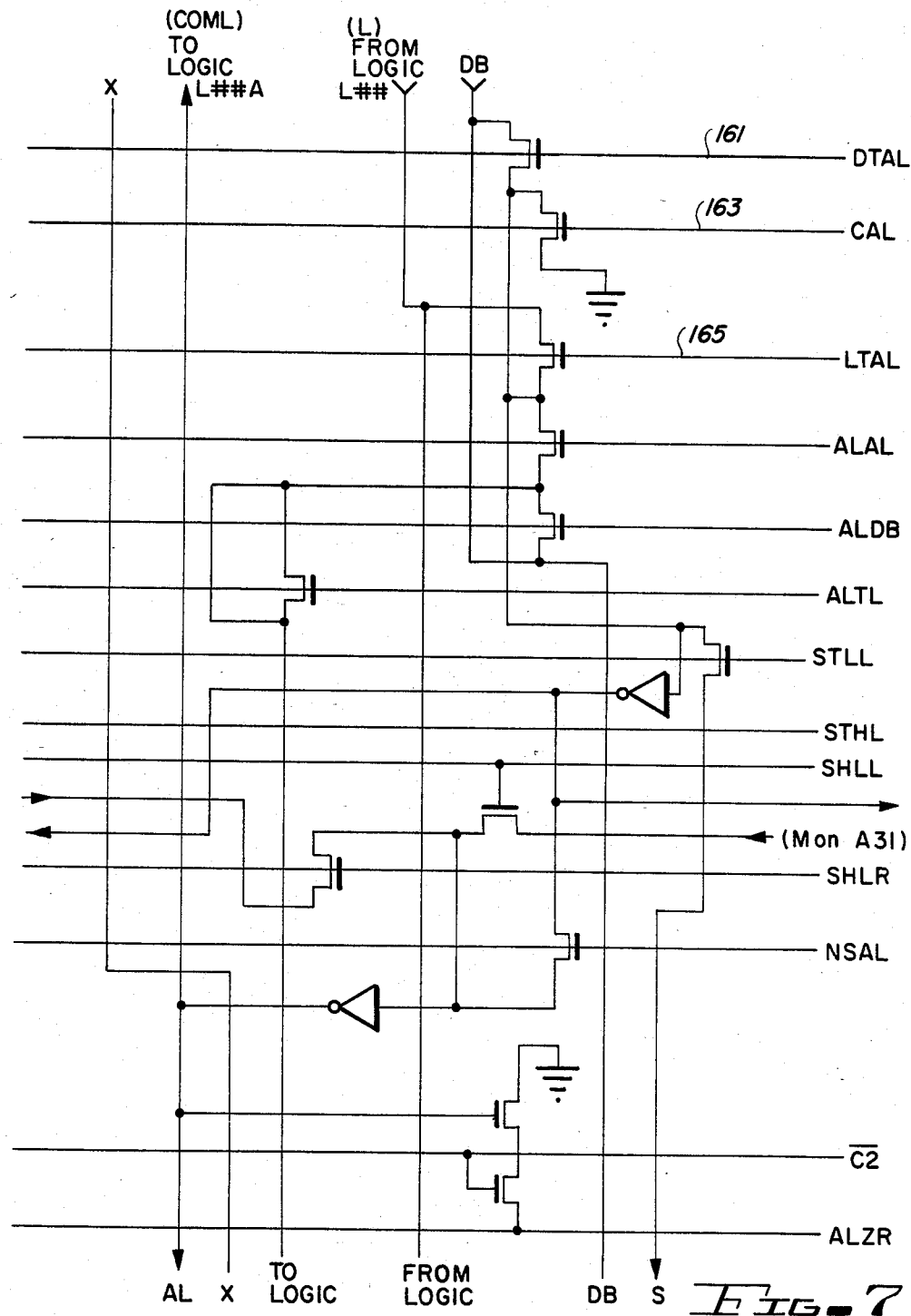
FIG. 7 shows a detailed logic diagram of the basic Accumulator Low (AL) cell of which the AL portion of Accumulator 40 is constructed.
Figure 8:
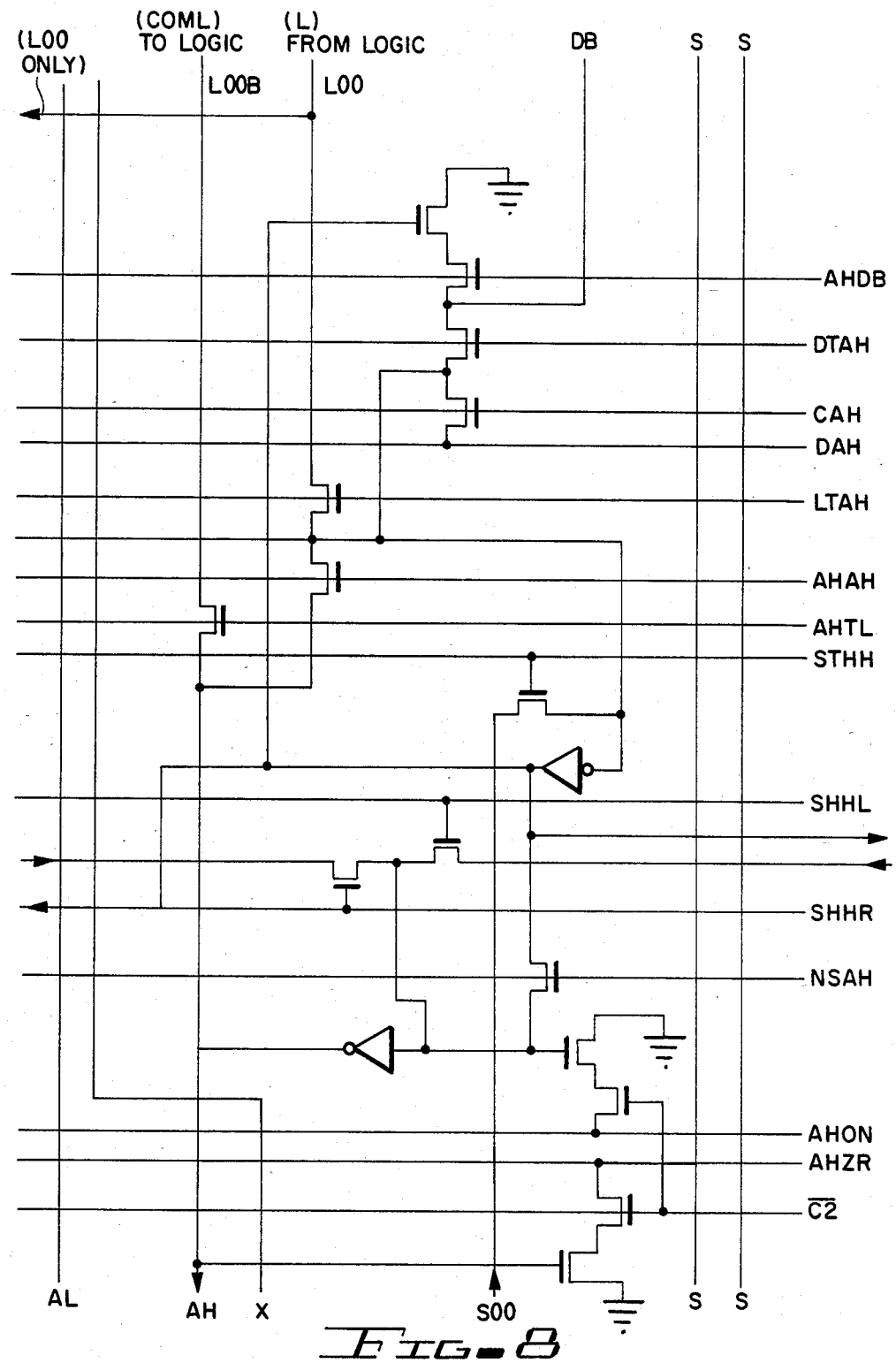
Figures 9, 12:
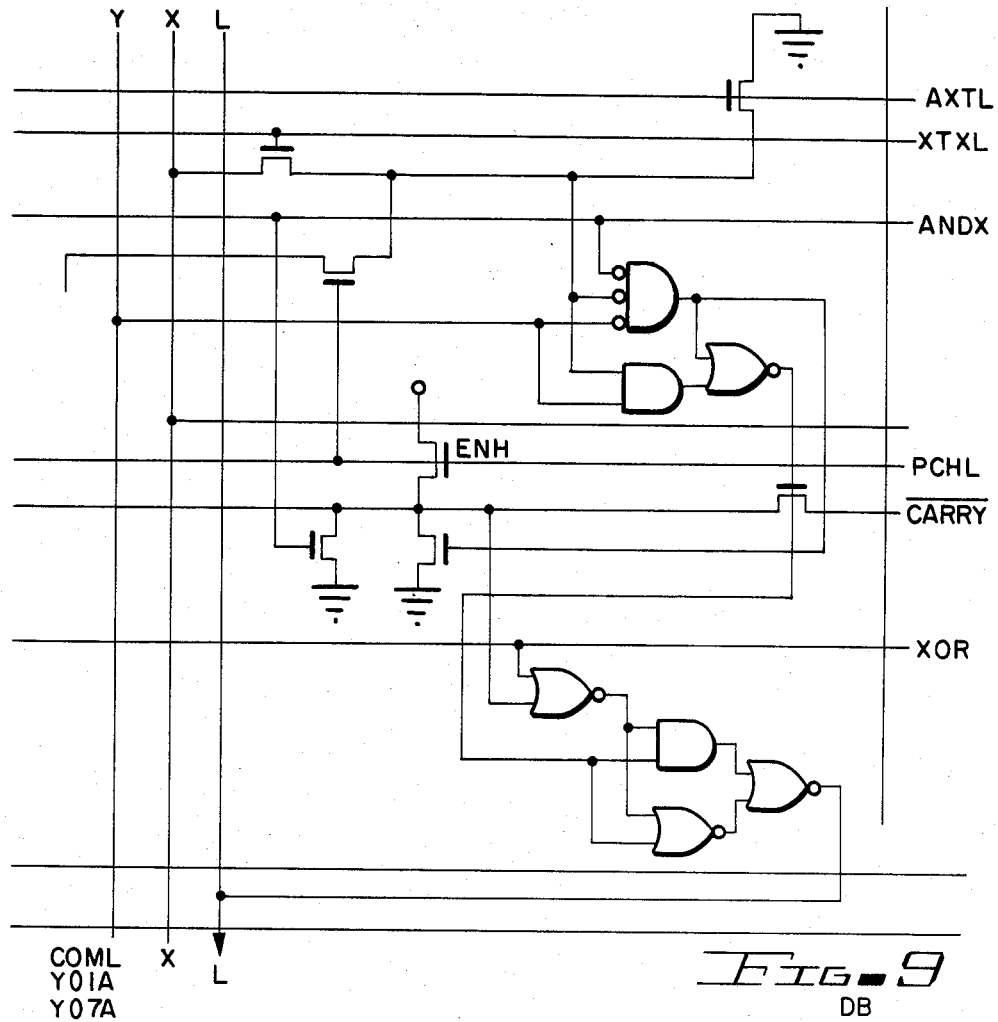
FIG. 9 shows a detailed logic diagram of the basic Logic Unit cell of which the Logic Unit 36 is constructed.
FIG. 12 shows a detailed logic diagram of the basic Y Register cell of which Y Register 20 is constructed.
Figure 15:
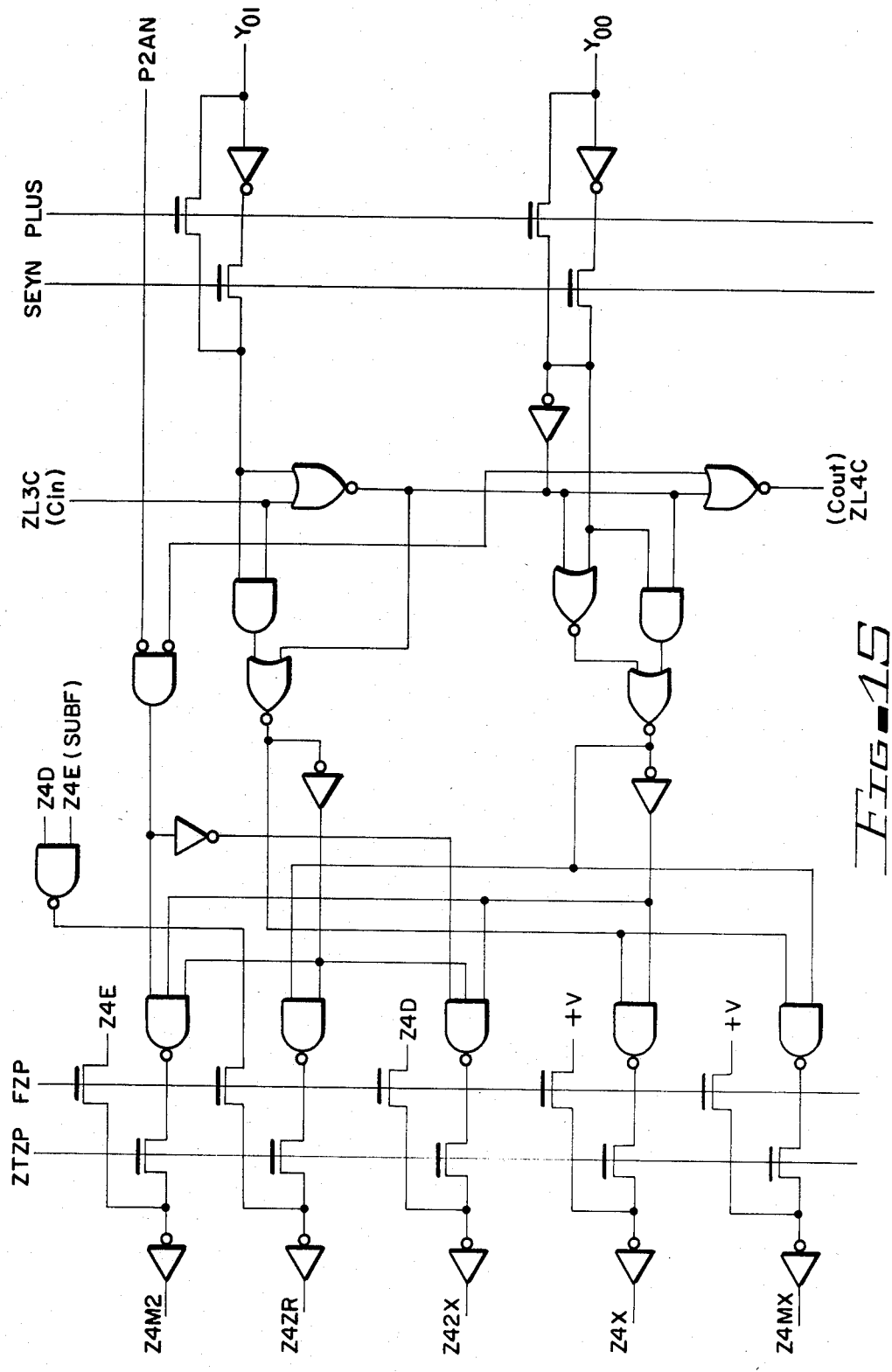
FIG. 15 shows a detailed logic diagram of the basic Z Register (Level 4) cell of which a portion of the Z Register 30 is constructed.

For example, regarding FIG. 7, which illustrates a detailed logic diagram of the basic Accumulator Low (AL) cell of which is the AL portion of Accumulator 40 is constructed, the DTAL, CAL, and LTAL control inputs on lines 161, 163, and 165, respectively, are generated over the identical lines shown in FIG. 5-0. Similarly, the other control signals to the individual cells may in general be found along the bottom of the Function Decode logic shown in FIG. 5.

It will be apparent to those skilled in the art that the disclosed Two-Pass Multiplier/Accumulator Circuit may be modified in numerous ways and may assume many embodiments other than the preferred form specifically set out and described above.

For example, the Multiplier/Accumulator 1 can be implemented independently of the RAM 50.

Accordingly, it is intended by the appended claims to cover all modifications of the invention which fall within the true spirit and scope of the invention.

TABLE 1
M/A REGISTER BIT WEIGHTS

X: $-2^{15}$, $2^{14}$, ..., $2^1$, $2^0$

TABLE 1-continued
M/A REGISTER BIT WEIGHTS

AH: $2^{31}$, $2^{30}$, ..., $2^{17}$, $2^{16}$
AL: $2^{15}$, $2^{14}$, ..., $2^1$, $2^0$
INTEGER Mode X: $-2^0$, $2^{-1}$, ..., $2^{-14}$, $2^{-15}$
Y: $-2^0$, $2^{-1}$, ..., $2^{-14}$, $2^{-15}$
AX: sign bit extended, $-2^8$, $2^7$, ..., $2^2$, $2^1$
AH: $2^0$, $2^{-1}$, ..., $2^{-14}$, $2^{-15}$
AL: $2^{-16}$, $2^{-17}$, ..., $2^{-30}$, $2^{-31}$
FRACTION Mode Y: $-2^{15}$, $2^{14}$, ..., $2^1$, $2^0$
AX: sign bit extended, $-2^{39}$, $2^{38}$, ..., $2^{33}$, $2^{32}$

TABLE 2
M/A FUNCTIONS

| F 43210 | DIF | MNEMONIC | DATA TRANSFER | FUNCTION/OPERATION CONTROL |
|---|---|---|---|---|
| 00000 | | RDAL | AL → B | If INTG mode:  ⎫ start DELAYED |
| 00001 | | RDAH | AH → B | If FRAC mode: ⎬ MULTIPLY or |
| 00010 | | RDALL | AL (LIM) → B ① | If INTG mode: ⎬ MULTIPLY-ROUND |
| 00011 | | RDAHL | AH (LIM) → B ① | If FRAC mode: ⎭ |
| 00100 | | RDAX | AX → B | None |
| 00101 | | RDST | ST, MR → B | None |
| 00110 | | ASL | A (L1) → A | ⎫ Shift A (40 bits) left with 0 fill |
| 00111 | | ASR | A (R1) → A | ⎬ or right with sign extension, 1 bit |
| 01000 | * | LDXMPY | B → X | Start MULTIPLY |
| 01001 | * | LDXMPR | B → X | Start MULTIPLY-ROUND |
| 01010 | * | LDXMAC | B → X | Start MULTIPLY-ACCUMULATE |
| 01011 | * | LDXABS | B → X | Start ABSOLUTE |
| 01100 | | LDXADD | B → X | Start ADD |
| 01101 | | LDXSUB | B → X | Start SUBTRACT |
| 01110 | | LDAL | B → AL ② | If INTG mode:  ⎫ start DELAYED |
| 01111 | | LDAH | B → AH ③ | If FRAC mode: ⎭ MULTIPLY-ACCUMULATE |
| 10000 | | LDYPM | B → Y | Set PLUS/MINUS mode (MREV = 0/1) |
| 10001 | | LDYDIF | B → Y | Set DIF |
| 10010 | | LDYP | B → Y | Set PLUS mode |
| 10011 | | LDYM | B → Y | Set MINUS mode |
| 10100 | * | LDXMAX | B → X | Start MAXIMUM |
| 10101 | * | LDXMIN | B → X | Start MINIMUM |
| 10110 | | LDXAND | B → X | Start LOGICAL AND |
| 10111 | | LDMR | B → MR | Set/Clear modes |
| 11000 | * | LDXDMP | B → X | Set MULTIPLY-DELAYED |
| 11001 | * | LDXDMR | B → X | Set MULTIPLY-ROUND DELAYED |
| 11010 | * | LDXDMA | B → X | Set MULTIPLY-ACCUMULATE DELAYED |
| 11011 | | LDXMSY | B → X | Start SIGN MULTIPLY |
| 11100 | * | LDXCMP | B → X | Start COMPARE |
| 11101 | * | LDXDIV | B → X | Start DIVIDE |
| 11110 | | LDXEOR | B → X | Start LOGICAL EXCLUSIVE OR |
| 11111 | | LDXNEG | B → X | Start NEGATE |

*Start DIFFERENCE mode if pending.
See infra for details of Read A Limited.
2 If FIRST LOAD, propagate sign into AH & AX, then clear FIRST LOAD.
3 Propagate sign into AX: if FIRST LOAD: 0 → AL, then clear FIRST LOAD.
All LDX functions set FIRST LOAD and FIRST READ.

TABLE 3

| Mode | FSRD | VH | VL | N | RDAHL | RDALL |
|---|---|---|---|---|---|---|
| FRAC | — | 0 | — | — | AH | AL |
| | | 1 | 0 | | 7FFF | FFFF |
| | | 1 | 1 | | 8000 | 0000 |
| INTG | — | 0 | — | — | AH | |
| | — | 1 | — | 0 | 7FFF | |

TABLE 3-continued

| Mode | FSRD | VH | VL | N | RDAHL | RDALL |
|------|------|----|----|---|-------|-------|
| — | — | 1 | — | 1 | 8000 | |
| 1 | — | 0 | — | | | AL |
| 1 | — | 1 | 0 | | | 7FFF |
| 1 | — | 1 | 1 | | | 8000 |
| 0 | 0 | — | — | | | AL |
| 0 | 1 | — | 0 | | | FFFF |
| 0 | 1 | — | 1 | | | 0000 |

TABLE 4
M/A OPERATIONS

| OPERATION | MNEMONIC | CONDITION | MATHEMATICAL DESCRIPTION | # CYCLES FRAC | # CYCLES INTG |
|-----------|----------|-----------|--------------------------|---------------|---------------|
| DIFFERENCE | DIF | | $(Y/2 - X/2) \rightarrow Y$ and $X$ | 1 | 1 |
| MULTIPLY | MPY, DMP | | $\pm X * Y \rightarrow A$ | 2 | 2 |
| MULTIPLY-ROUND | MPR, DMR | FRAC | $2^{-16} \pm X * Y \rightarrow A$ | 2 | — |
| | | INTG | $\pm X * Y \rightarrow A$ | — | 2 |
| MULTIPLY-ACCUMULATE | MAC, DMA | | $A \pm X * Y \rightarrow A$ | 2 | 2 |
| ADD | ADD | | $A + X \rightarrow A$ | 1 | 2 |
| SUBTRACT | SUB | | $A - X \rightarrow A$ | 1 | 2 |
| COMPARE | CMP | MAG = 0 | $Am - X$; sign $\rightarrow S$ | 1 | 1 |
| | | MAG = 1 | $|Am| - |X|$; sign $\rightarrow S$ | 1 | 1 |
| MAXIMUM | MAX | | $AX + 1 \rightarrow AX$: [COMPARE]; if $S = 1$: $X \rightarrow Am$, $AX \rightarrow An$ | 2 | 2 |
| MINIMUM | MIN | | $AX + 1 \rightarrow AX$: [COMPARE]; if $S = 0$: $X \rightarrow Am$, $AX \rightarrow An$ | 2 | 2 |
| NEGATE | NEG | | $-X \rightarrow A$ | 1 | 1 |
| ABSOLUTE | ABS | ACC = 0 | $|X| \rightarrow A$ | 1 | 1 |
| | | ACC = 1 | $A + |X| \rightarrow A$ | 1 | 2 |
| SIGN MULTIPLY | MSY | ACC = 0 | $\pm X * \text{sign}(Y) \rightarrow A$ | 1 | 1 |
| | | ACC = 1 | $A \pm X * \text{sign}(Y) \rightarrow A$ | 1 | 2 |
| LOGICAL AND | AND | | $X \cdot Am \rightarrow Am$; $0 \rightarrow An$ & $AX$ | 1 | 1 |
| EXCLUSIVE OR | EOR | | $X \oplus Am \rightarrow Am$; $0 \rightarrow An$ & $AX$ | 1 | 1 |
| DIVIDE | DIV | FRAC | AH (MSB) $\rightarrow \underline{M}$; $2 * A \pm X + M * 2^{-31} \rightarrow A$ (16 times) | 16 | — |
| | | INTG | Undefined | — | 16 |

±: Except DIVIDE: + in PLUS mode, − in MINUS mode.
DIVIDE: + if M = 1, − if M = 0
Am: AH in FRAC mode, AL in INTG mode
An: AL in FRAC mode, AH in INTG mode

TABLE 5
M/A CONTROL INPUTS

| LD FIERC EMMDE | DATA TRANSFER | ENAB. FUNC. |
|----------------|---------------|-------------|
| X 01001 | DB → B → M | 0 |
| X 01011 | M → B → DB | 0 |
| X 01101 | DB → B → M | 0 |
| X 01111 | M → B → DB | 0 |
| 0 10001 | R → B (no dest.) | 1 |
| 0 10011 | R → B → DB | 1 |
| 0 10101 | R → B → DB | 1 |
| 0 10111 | R → B (no dest.) | 1 |
| 0 110X1 | R → B → M | 1 |
| 0 11100 | DB → B → M | 0 |
| 0 11101 | R → B → M & DB | 1 |
| 0 11110 | DB → B → M | 0 |
| 0 11111 | R → B → DB | 1 |
| 1 10001 | DB → B → R | 1 |
| 1 10011 | Am → B → R | 1 |
| 1 10100 | Am → B → DB | 0 |
| 1 10101 | DB → B → R | 1 |
| 1 10111 | DB → B → R | 1 |
| 1 11001 | Am → B → M & R | 1 |
| 1 11011 | M → B → R | 1 |
| 1 11100 | M → B → R & DB | 1 |
| 1 11101 | DB → B → R | 1 |
| 1 11110 | M → B → DB | 0 |
| 1 11111 | DB → B → R | 1 |
| all others | NONE | 0 |

LD: (F4'F3) = 1 (Load register)
DB: Data Bus (external)
B: Internal Bus
M: Memory (on-chip RAM)
R: Register selected by F field.
Am: AH in FRAC mode, AL in INTG mode.

TABLE 6
M/A CONTROL

| Y | Y + 85 +$C_i$ | Pass | 64·$Z_4$ | X-Select 16·$Z_3$ | 4·$Z_2$ | $Z_1$ | |
|---|---|---|---|---|---|---|---|
| 0 | 85 | | 0 | 0 | 0 | 0 | if SUB: |
| 1 | 86 | | ↓ | ↓ | ↓ | +1 | use $\overline{Y}$ |
| 2 | 87 | | ↓ | ↓ | ↓ | +2 | instead of Y |
| 3 | 88 | | ↓ | ↓ | +4 | −1 | $C_i = 1$: |
| 4 | 89 | | ↓ | ↓ | ↓ | 0 | Pass 1 · SUB |
| 5 | 90 | | ↓ | ↓ | ↓ | +1 | or |
| 6 | 91 | | ↓ | ↓ | ↓ | +2 | Pass 2 · $C_0$ |
| 7 | 92 | | ↓ | ↓ | +8 | −1 | from Pass 1 |
| 11 | 96 | | ↓ | +16 | −4 | −1 | |
| 27 | 112 | | ↓ | +32 | −4 | −1 | |
| 43 | 128 | | +64 | −16 | −4 | −1 | |

TABLE 6-continued

| | | | | M/A CONTROL | | | | |
|---|---|---|---|---|---|---|---|---|
| | 107 | 192 | | +128 | −16 | −4 | −1 | |
| | 127 | 212 | | ↓ | 0 | 0 | −1 | |
| | 128 | 213 | 1 | +128 | 0 | 0 | 0 | |
| | 129 | 214 | 1 | ↓ | 0 | 0 | +1 | |
| | 170 | 255 | 1 | ↓ | +32 | +8 | +2 | |
| −128 | 128 | 213 | 2 | −128 | 0 | 0 | 0 | |
| −127 | 129 | 214 | 2 | ↓ | 0 | 0 | 1 | |
| −86 | 170 | 255 | 2 | ↓ | +32 | +8 | +2 | |
| −85 | 171 | $C_o$ 0 | | −64 | −16 | −4 | −1 | |
| −21 | 235 | ↓ 64 | | 0 | −16 | −4 | −1 | |
| −1 | 255 | ↓ 84 | | ↓ | 0 | 0 | −1 | |
| 0 | 256 | ↓ 85 | | ↓ | 0 | 0 | 0 | |
| $Z = (Y+85+C_i)$ | | | | XX | $Z_1$ | $4 \cdot Z_2$ | $16 \cdot Z_3$ | $64 \cdot Z_4$ |
| | | | | 00 | −1 | −4 | −16 | −64 |
| XX | XX | XX | XX | 01 | 0 | 0 | 0 | 0 |
| | | | | 10 | +1 | +4 | +16 | +64 |
| | | | | | | | | +128 |
| Z4 | Z3 | Z2 | Z1 | 11 | +2 | +8 | +32 | −128* |

*only on Pass 2 and (YO ⊕ MINUS) = 1 (negative)

What is claimed is:

1. A digital multiplier/accumulator circuit for generating the product of first and second binary numbers, said circuit comprising:

an M-bit multiplicand register for storing said first binary number, said first binary number having M or fewer bits;

an N-bit multiplier register for storing said second binary number, said second binary number having N or fewer bits, said multiplier register being divided into first and second equal portions;

control logic for controlling the operation of said multiplier circuit, said control logic generating at least one control signal in response to one of a plurality of commands applied thereto;

an array of P multiplier decoders, where P=N/4, for decoding a multiplier operand which is stored in either said first portion or said second portion of said multiplier register, and for generating either a first plurality of multiplier decoder outputs or a second plurality of multiplier decoder outputs in response to first and second control signals, respectively, generated successively by said control logic;

the first of said decoders decoding the 2 least significant bits of said multiplier operand and generating 1 of 4 possible first decoder outputs representing multiplication of said multiplicand by the factors 0, +1, −1, or 2, respectively;

a second of said decoders decoding the next 2 higher significant bits of said multiplier operand, and generating 1 of 4 possible second decoder outputs representing multiplication of said multiplicand by the factors 0, +2, −2, or 4, respectively;

each successive decoder decoding the next 2 higher significant bits of said multiplier operand, with the Pth of said decoders decoding the 2 most significant bits of said multiplier operand and generating 1 of 4 possible Pth decoder outputs representing multiplication of said multiplicand by the factors 0, $+2^{2(P-1)}$, or $-2^{2(P-1)}$, or $2^{2P-1}$, respectively, where P represents the Pth decoder;

an accumulator register having 2(M+P) bit positions for storing results of the operations of said digital multiplier/accumulator circuit;

an array of P full adders, each being (M+2) bits in length, said control logic being responsive to said first control signal for causing the least significant M stages of said first adder to be responsive both to the contents of corresponding bits of said multiplicand register and to the output of said first multiplier decoder, and to generate a partial sum equal to the product of said first binary number and said first multiplier decoder output, the two least significant bits of said partial sum being stored in the two least significant bit positions of said accumulator;

the least significant M stages of each successive adder being responsive to the contents of corresponding bits of said multiplicand register, to the M most significant bits of the partial product generated by the previous adder, and to the corresponding successive multiplier decoder output, and each generating a partial sum equal to the sum of the contents of the M most significant stages of the previous adder and the product of said first binary number multiplied by said decoder output, the two least significant bits of each successive partial sum being stored in successively higher significant bit positions of said accumulator, the entire (M+2) bits of the Pth partial sum also being stored in bit positions of said accumulator which are adjacent to and successively higher than said two least significant bits of the (P−1)th partial sum;

said control logic being responsive to said second control signal for conducting the (M+1)th through (2M+2)th bits of said accumulator to the 1st through (M+2)th stages, respectively, of said first adder and enabling the least significant M stages of said first adder to be responsive to the contents of corresponding bits of said multiplicand register, to the contents of said (M+1)th through (2M)th bits of said accumulator, and to said first multiplier decoder generating one of said second plurality of multiplier decoder outputs, and to thereby generate a patrial sum equal to the sum of said (M+1)th through (2M)th bits of said accumulator and the product of said first binary number and said first multiplier decoder output, the two least significant bits of said partial sum being stored in the (M+1)th and (M+2)th bit positions of said accumulator;

the (M+1)th and (M+2)th stages of said first adder being responsive to the contents of the (2M+1)th and (2M+2)th bits, respectively, of said accumulator and generating a partial sum;

the two most significant stages of the Pth successive adder being responsive to the contents of the (2(M+P)−1)th and 2(M+P)th bits, respectively, of said accumulator and generating a partial sum;

the least significant M stages of each successive adder being responsive to the contents of corresponding bits of sail multiplicand register, to the M most significant bits of the partial product generated by the previous adder, and to the corresponding successive multiplier decoder output, and each generating a partial sum equal to the sum of the contents of the M most significant stages of the previous adder and the product of said first binary number multiplied by said decoder output, the two least significant bits of each successive partial sum being stored in successively higher significant bit positions of said accumulator, the entire M+2 bits of the Pth partial sum also being stored in bit positions of said accumulator which are adjacent to and successively higher than said two least significant bits of the (P−1)th partial sum;

whereby after the successive generation of said first and second control signals, the product of said first and second binary numbers is stored in said accumulator register.

2. The digital multiplier/accumulator circuit as recited in claim 1 and further comprising:

an array of P sign/carry circuits, one being associated with each of said full adders, each sign/carry circuit generating a sign signal and a carry signal, the first sign/carry circuit being responsive to sign and carry signals provided by said accumulator, each successive sign/carry circuit being responsive to a sign signal provided by the previous sign/carry circuit and to a carry signal provided by the most significant stage of the previous full adder.

3. A digital multiplier/accumulator circuit for generating the product of first and second binary numbers, said binary numbers each having 16 or fewer bits, said circuit comprising:

a 16-bit multiplicand register for storing said first binary number;

a 16-bit multiplier register for storing said second binary number, said multiplier register being divided into first and second 8-bit portions;

control logic for controlling the operation of said multiplier circuit, said control logic generating at least one control signal in response to one of a plurality of commands applied thereto;

an array of 4 multiplier decoders for decoding a multiplier operand which is stored in either said first portion or said second portion of said multiplier register, and for generating either a first plurality of multiplier decoder outputs or a second plurality of multiplier decoder outputs in response to first and second control signals, respectively, generated successively by said control logic;

the first of said decoders decoding the 2 least significant bits of said multiplier operand and generating 1 of 4 possible first decoder outputs representing multiplication of said multiplicand by the factors 0, +1, −1, or 2, respectively;

a second of said decoders decoding the next 2 higher significant bits of said multiplier operand, and generating 1 of 4 possible second decoder outputs representing multiplication of said multiplicand by the factors 0, +2, −2, or 4, respectively;

each successive decoder decoding the next 2 higher significant bits of said multiplier operand, with the 4th of said decoders decoding the 2 most significant bits of said multiplier operand, the Pth of said decoders generating 1 of 4 possible fourth decoder outputs representing multiplication of said multiplicand by the factors 0, $+2^{2(P-1)}$, $-2^{2(P-1)}$, or $2^{2P-1}$, respectively, where P represents the Pth decoder;

an accumulator register having 40 bit positions for storing results of the operations of said digital multiplier/accumulator circuit;

an array of 4 full adders, each being 18 bits in length, said control logic being responsive to said first control signal for causing the least significant 16 stages of said first adder to be responsive both to the contents of corresponding bits of said multiplicand register and to the output of said first multiplier decoder, and to generate a partial sum equal to the product of said first binary number and said first multiplier decoder output, the two least significant bits of said partial sum being stored in the two least significant bit positions of said accumulator;

the least significant 16 stages of each successive adder being responsive to the contents of corresponding bits of said multiplicand register, to the 16 most significant bits of the partial product generated by the previous adder, and to the corresponding successive multiplier decoder output, and each generating a partial sum equal to the sum of the contents of the 16 most significant stages of the previous adder and the product of said first binary number multiplied by said decoder output, the two least significant bits of each successive partial sum being stored in successively higher significant bit positions of said accumulator, the entire 18 bits of the fourth partial sum also being stored in bit positions of said accumulator which are adjacent to and successively higher than said two least significant bits of the third partial sum;

said control logic being responsive to said second control signal for conducting the 17th through 34th bits of said accumulator to the 1st through 18th stages, respectively, of said first adder, and enabling the least significant 16 stages of said first adder to be responsive to the contents of corresponding bits of said multiplicand register, to the contents of said 17th through 32nd bits of said accumulator, and to said first multiplier decoder generating one of said second plurality of multiplier decoder outputs, and to thereby generate a partial sum equal to the sum of said 17th through 32nd bits of said accumulator and the product of said first binary number and said first multiplier decoder output, the two least significant bits of said partial sum being stored in the 17th and 18th bit positions of said accumulator;

the 17th and 18th stages of said first adder being responsive to the contents of the 33rd and 34th bits, respectively, of said accumulator and generating a partial sum;

the two most significant stages of the Pth successive adder being responsive to the contents of the (2(M+P)−1)th and 2(M+P)th bits, respectively, of said accumulator and generating a partial sum;

the least significant 16 stages of each successive adder being responsive to the contents of corresponding bits of said multiplicand register, to the 16 most significant bits of the partial product generated by the previous adder, and to the corresponding successive multiplier decoder output, and each generating a partial sum equal to the sum of the 16 most significant bits of the partial product generated by the previous adder and the product of said first binary number multiplied by said decoder output, the two least significant bits of each successive partial sum being stored in successively higher significant bit positions of said accumulator, the entire 18 bits of the 4th partial sum also being stored in bit positions of said accumulator which are adjacent to and successively higher than said two least significant bits of the 3rd partial sum;

whereby after the successive generation of said first and second control signals, the product of said first and second binary numbers is stored in said accumulator register.

4. The digital multiplier/accumulator circuit as recited in claim 3 and further comprising:

an array of 4 sign/carry circuits, one being associated with each of said full adders, each sign/carry circuit generating a sign signal and a carry signal, the first sign/carry circuit being responsive to sign and carry signals provided by said accumulator, each successive sign/carry circuit being responsive to a sign signal provided by the previous sign/carry circuit and to a carry signal provided by the most significant stage of the previous full adder.

5. A method for multiplying first and second binary numbers, said method comprising:

providing an M-bit multiplicand register for storing said first binary number, said first binary number having M of fewer bits;

providing an N-bit multiplier register for storing said second binary number, said second binary number having N or fewer bits, said multiplier register being divided into first and second equal portions;

providing an array of P multiplier decoders, where P=N/4;

employing said array of multiplier decoders to decode a multiplier operand which is stored in said first portion of said multiplier register, and generating a first plurality of multiplier decoder outputs, the first of said decoders decoding the 2 least significant bits of said multiplier operand and generating 1 of 4 possible first decoder outputs representing multiplication of said multiplicand by the factors 0, +1, −1, or 2, respectively;

a second of said decoders decoding the next 2 higher significant bits of said multiplier operand, and generating 1 of 4 possible second decoder outputs representing multiplication of said multiplicand by the factors 0, +2, −2, or 4, respectively;

each successive decoder decoding the next 2 higher significant bits of said multiplier operand, with the Pth of said decoders decoding the 2 most significant bits of said multiplier operand and generating 1 of 4 possible Pth decoder outputs representing multiplication of said multiplicand by the factors 0, $+2^{2(P-1)}$, $-2^{2(P-1)}$, or $2^{2P-1}$, respectively, where P represents the Pth decoder;

providing an accumulator register having 2(M+P) bit positions for storing results of the operations of said digital multiplier/accumulator circuit;

providing an array of P full adders, each being (M+2) bits in length;

causing the least significant M stages of said first adder to be responsive both to the contents of corresponding bits of said multiplicand register and to the output of said first multiplier decoder, and to generate a partial sum equal to the product of said first binary number and said first multiplier decoder output, the two least significant bits of said partial sum being stored in the two least significant bit positions of said accumulator;

the least significant M stages of each successive adder being responsive to the contents of corresponding bits of said multiplicand register, to the M most significant bits of the partial product generated by the previous adder, and to the corresponding successive multiplier decoder output, and each generating a partial sum equal to the sum of the contents of the M most significant stages of the previous adder and the product of said first binary number multiplied by said decoder output, the two least significant bits of each successive partial sum being stored in successively higher significant bit positions of said accumulator, the entire (M+2) bits of the Pth partial sum also being stored in bit positions of said accumulator which are adjacent to and successively higher than said two least significant bits of the (P−1)th partial sum;

conducting the (M+1)th through (2M+2)th bits of said accumulator to the 1st through (M+2)th stages, respectively, of said first adder, and enabling the least significant M stages of said first adder to be responsive to the contents of corresponding bits of said multiplicand register, to the contents of said (M+1)th through (2M)th bits of said accumulator, and to said first multiplier decoder generating one of said second plurality of multiplier decoder outputs, and to thereby generate a partial sum equal to the sum of said (M+1)th through (2M)th bits of said accumulator and the product of said first binary number and said first multiplier decoder output, the two least significant bits of said partial sum being stored in the (M+1)th and (M+2)th bit positions of said accumulator;

the (M+1)th and (M+2)th stages of said first adder being responsive to the contents of the (2M+1)th and (2m+2)th bits, respectively, of said accumulator and generating a partial sum;

the two most significant stages of the Pth successive adder being responsive to the contents of the (2(M+P)−1)th and 2(M+P)th bits, respectively, of said accumulator and generating a partial sum;

the least significant M stages of each successive adder being responsive to the contents of corresponding bits of said multiplicand register, to the M most significant bits of the partial product generated by the previous adder, and to the corresponding successive multiplier decoder output, and each generating a partial sum equal to the sum of the contents of the M most significant stages of the previous adder and the product of said first binary number multiplied by said decoder output, the two least significant bits of each successive partial sum being stored in successively higher significant bit positions of said accumulator, the entire M+2 bits of the Pth partial sum also being stored in bit positions of said accumulator which are adjacent to and successively higher than said two least significant bits of the (P−1)th partial sum;

whereby after two successive multiplications of said first binary number by said first and second portions of said second binary number, respectively, the product of said first and second binary numbers is stored in said accumulator register.

6. A circuit for determining the maximum-valued number in a sequence of N numbers, wherein said maximum-valued number is the ith number is said sequence, said circuit comprising:

a first register into which is successively loaded each of said numbers in said sequence;

a second register containing the current maximum-valued number;

comparing means for comparing the contents of said first register with the contents of said second register, said comparing means generating a control signal if said first register contents are greater than said second register contents;

means for transferring the contents of said first register to said second register in response to said control signal;

a third register, said third register being incremented by one in response to each compare operation performed by said comparing means;

a fourth register;

means for transferring the contents of said third register to said fourth register in response to said control signal;

whereby after the Nth number in said sequence has been loaded into said first register, said second register contains said maximum-valued number in said sequence, and said fourth register indicates the ith number in said sequence is said maximum-valued number.

7. The circuit recited in claim 6, wherein said comparing means, in comparing the contents of said first register with the contents of said second register, compares either the signed values or the absolute values of said contents, in response to a mode control signal input thereto.

8. A circuit for determining the minimum-valued number in a sequence of N numbers, wherein said minimum-valued number is the ith number in said sequence, said circuit comprising:

a first register into which is successively loaded each of said numbers in said sequence;

a second register containing the current minimum-valued number;

comparing means for comparing the contents of said first register with the contents of said second register, said comparing means generating a control signal if said first register contents are less than said second register contents;

means for transferring the contents of said first register to said second register in response to said control signal;

a third register, said third register being incremented by one in response to each compare operation performed by said comparing means;

a fourth register;

means for transferring the contents of said third register to said fourth register in response to said control signal;

whereby after the Nth number in said sequence has been loaded into said first register, said second register contains said minimum-valued number in said sequence, and said fourth register indicates the ith number in said sequence is said minimum-valued number.

9. The circuit recited in claim 8, wherein said comparing means, in comparing the contents of said first register with the contents of said second register, compares either the signed values or the absolute values of said contents in response to a mode control signal input thereto.

* * * * *